United States Patent
Oguchi

(10) Patent No.: US 10,104,273 B2
(45) Date of Patent: Oct. 16, 2018

(54) OPTICAL LOW PASS FILTER, IMAGE PICKUP DEVICE, AND IMAGE PICKUP APPARATUS

(71) Applicant: SONY CORPORATION, Tokyo (JP)

(72) Inventor: Hisayuki Oguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/903,148

(22) PCT Filed: Aug. 21, 2014

(86) PCT No.: PCT/JP2014/004289
§ 371 (c)(1),
(2) Date: Jan. 6, 2016

(87) PCT Pub. No.: WO2015/029388
PCT Pub. Date: Mar. 5, 2015

(65) Prior Publication Data
US 2016/0165107 A1 Jun. 9, 2016

(30) Foreign Application Priority Data
Aug. 28, 2013 (JP) ................................. 2013-176478

(51) Int. Cl.
*H04N 5/225* (2006.01)
*H04N 9/04* (2006.01)
(Continued)

(52) U.S. Cl.
CPC ......... *H04N 5/2254* (2013.01); *G02F 1/1337* (2013.01); *G02F 1/1395* (2013.01);
(Continued)

(58) Field of Classification Search
CPC .......... G02B 5/20; G02B 27/10; G02B 26/08; H04N 3/1587; H04N 5/2254; H04N 5/2259
(Continued)

(56) References Cited

U.S. PATENT DOCUMENTS

| 4,605,956 A * | 8/1986 | Cok ........................ H04N 9/045 348/242 |
| 6,108,036 A * | 8/2000 | Harada ................. H04N 3/1587 348/219.1 |
| 2009/0169126 A1 * | 7/2009 | Masuda ............ H01L 27/14621 382/255 |

FOREIGN PATENT DOCUMENTS

| CN | 101366289 A | 2/2009 |
| JP | 06-197260 A | 7/1994 |

(Continued)

OTHER PUBLICATIONS

Office Action for JP Patent Application No. 2013-176478, dated Mar. 14, 2017, 06 pages of Office Action and 07 pages of English Translation.

(Continued)

*Primary Examiner* — Nelson D. Hernández Hernández
(74) *Attorney, Agent, or Firm* — Chip Law Group

(57) ABSTRACT

There is provided an image pickup device including: an optical filter including a first birefringent member; a second birefringent member; a liquid crystal layer disposed between the first and second birefringent members and configured to control polarization; and an electrode configured to apply an electric field to the liquid crystal layer; and a drive circuit configured to apply an intermediate voltage or an intermediate frequency to the electrode.

20 Claims, 28 Drawing Sheets

(51) Int. Cl.
  *H04N 5/232* (2006.01)
  *G02F 1/139* (2006.01)
  *G02F 1/1337* (2006.01)
  *G02F 1/1335* (2006.01)
(52) U.S. Cl.
  CPC ...... *G02F 1/1396* (2013.01); *G02F 1/133514* (2013.01); *H04N 5/23267* (2013.01); *H04N 9/045* (2013.01)
(58) Field of Classification Search
  USPC .................................................. 348/343–344
  See application file for complete search history.

(56) References Cited

FOREIGN PATENT DOCUMENTS

| | | |
|---|---|---|
| JP | 08-214197 A | 8/1996 |
| JP | 09-015535 A | 1/1997 |
| JP | 09-15535 A | 1/1997 |
| JP | 2002-258258 A | 9/2002 |
| JP | 2013-153325 A | 8/2013 |
| WO | 2007/083783 A1 | 7/2007 |

OTHER PUBLICATIONS

Office Action for JP Patent Application No. 2013-176478, dated Sep. 26, 2017, 6 pages of Office Action and 6 pages of English Translation.
Office Action for CN Patent Application No. 201480045995.1, dated May 18, 2018, 11 pages of Office Action and 24 pages of English Translation.

* cited by examiner

[FIG. 1]
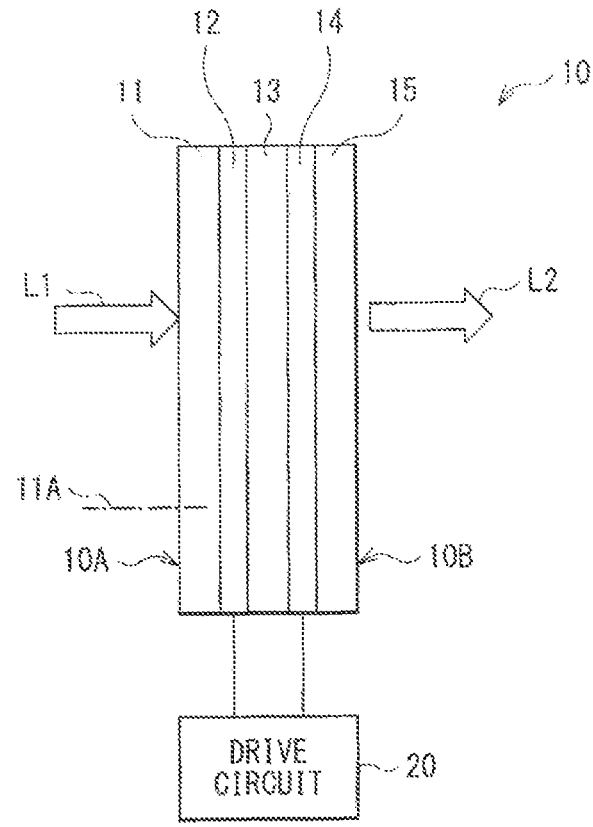
[FIG. 2]
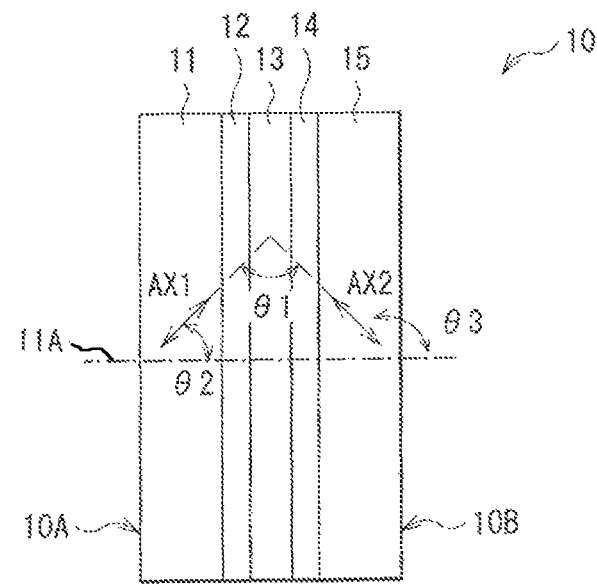

[ FIG. 3A ]
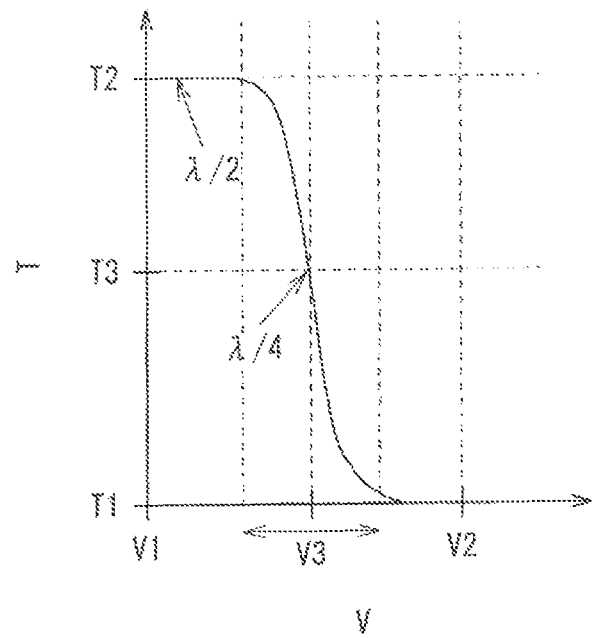
[ FIG. 3B ]
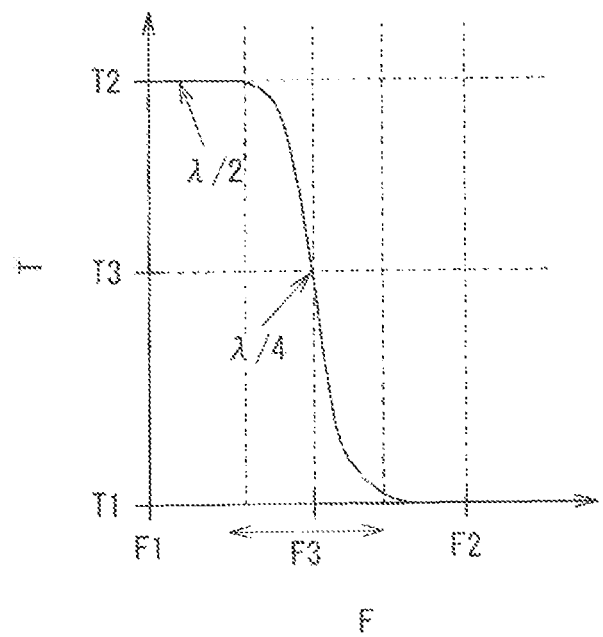

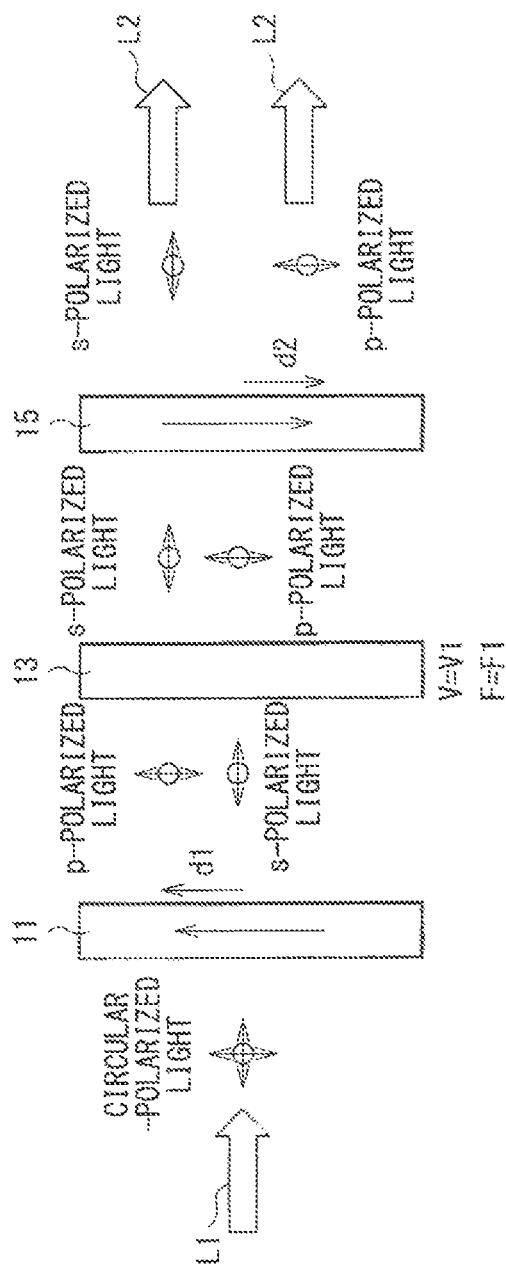

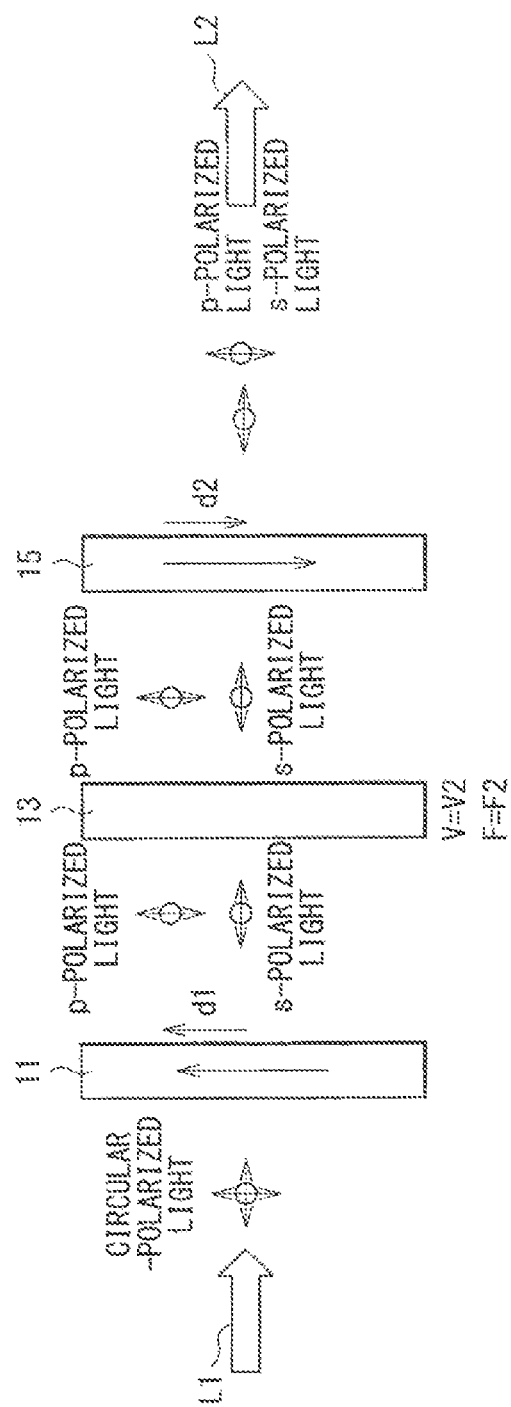

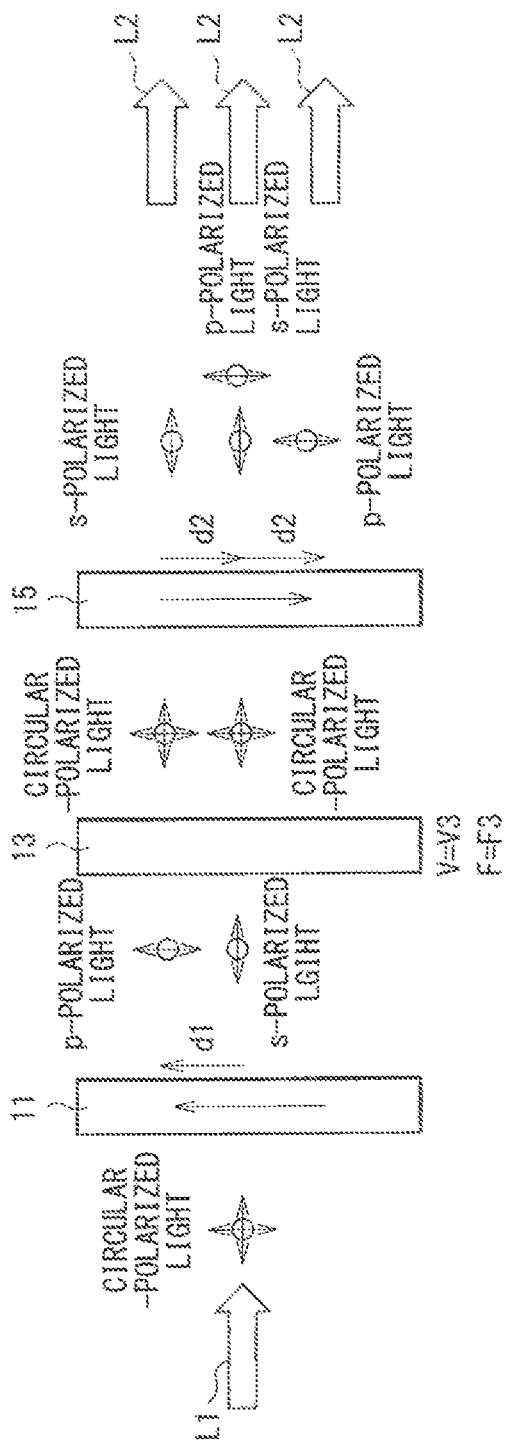

[ FIG. 5A ]
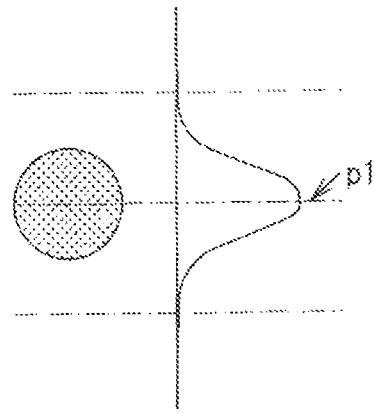
SPREAD OF POINT　　POINT IMAGE INTENSITY
IMAGE ON PICTURE　DISTRIBUTION
DATA
[ FIG. 5B ]
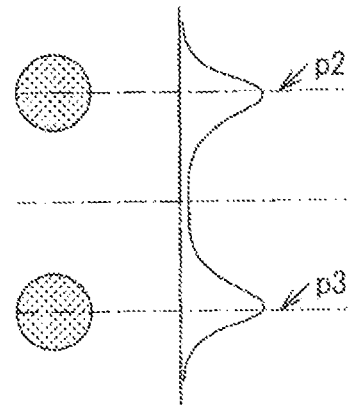
SPREAD OF POINT　　POINT IMAGE INTENSITY
IMAGE ON PICTURE　DISTRIBUTION
DATA

[FIG. 5C]
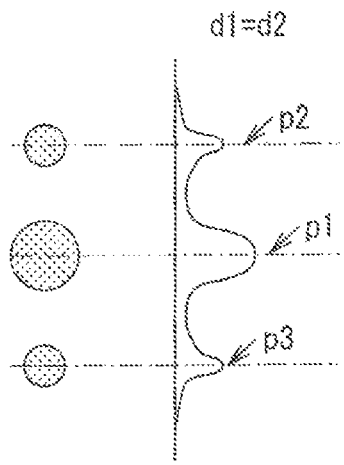
SPREAD OF POINT   POINT IMAGE INTENSITY
IMAGE ON PICTURE  DISTRIBUTION
DATA
[FIG. 5D]
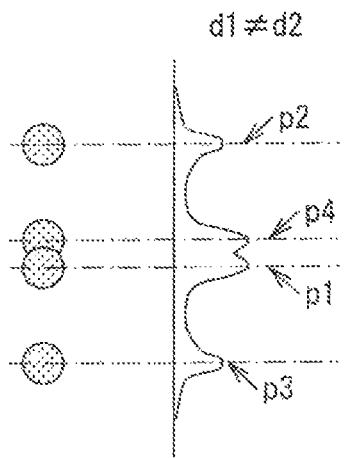
SPREAD OF POINT   POINT IMAGE INTENSITY
IMAGE ON PICTURE  DISTRIBUTION
DATA

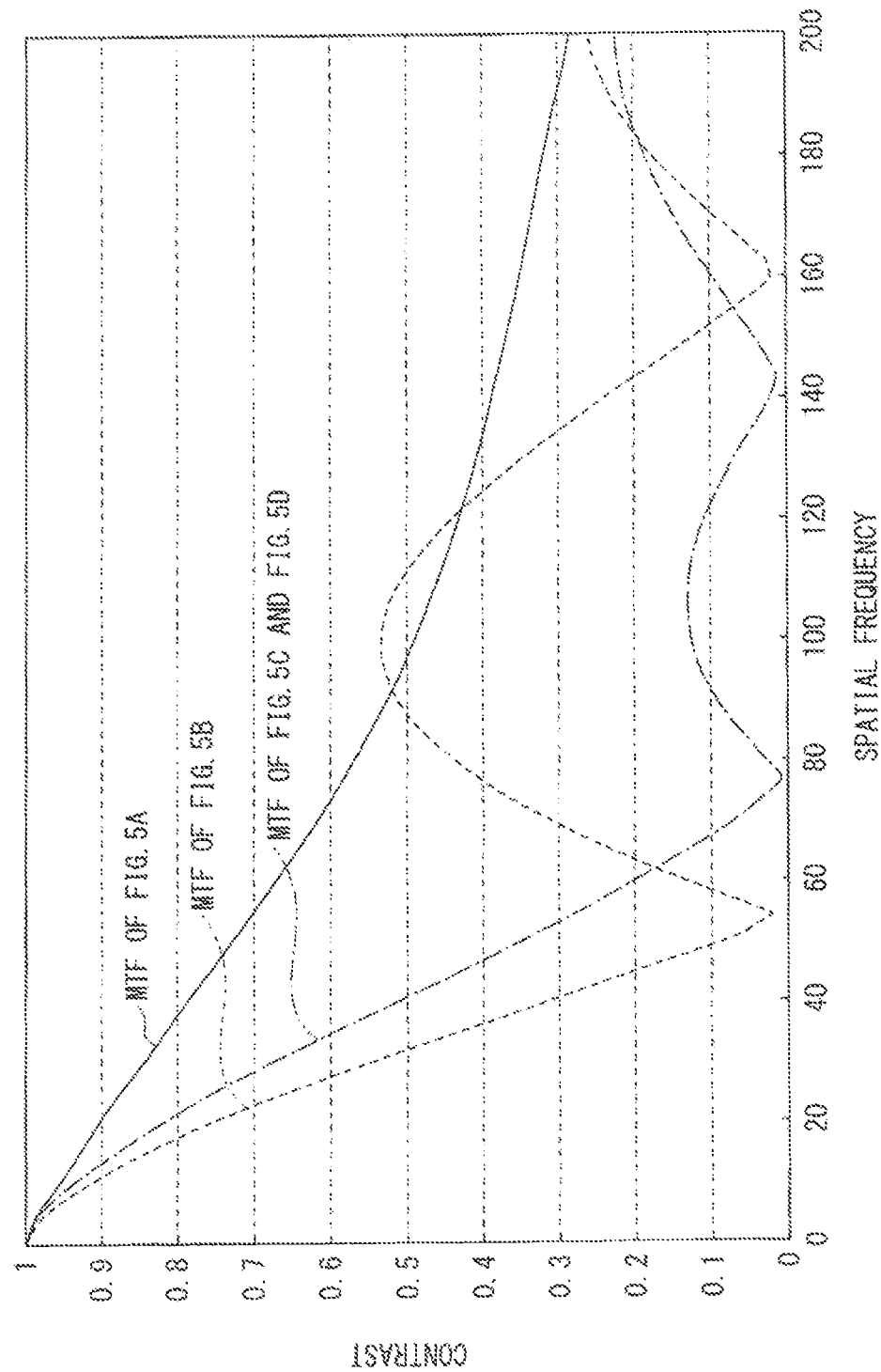
[FIG. 6]

[FIG. 7]
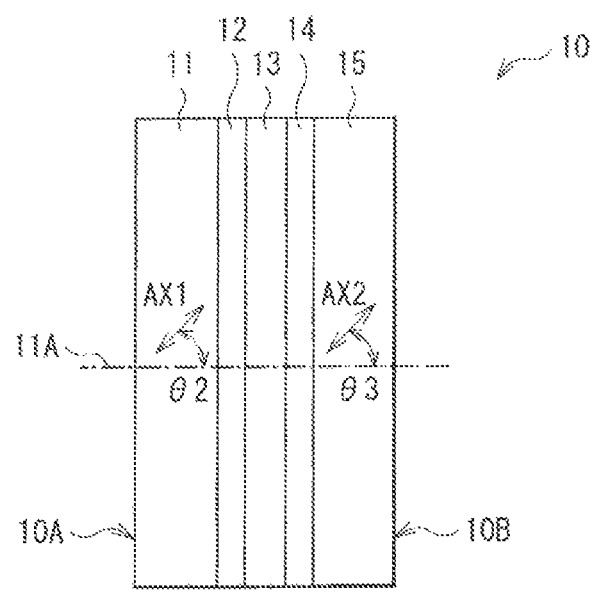

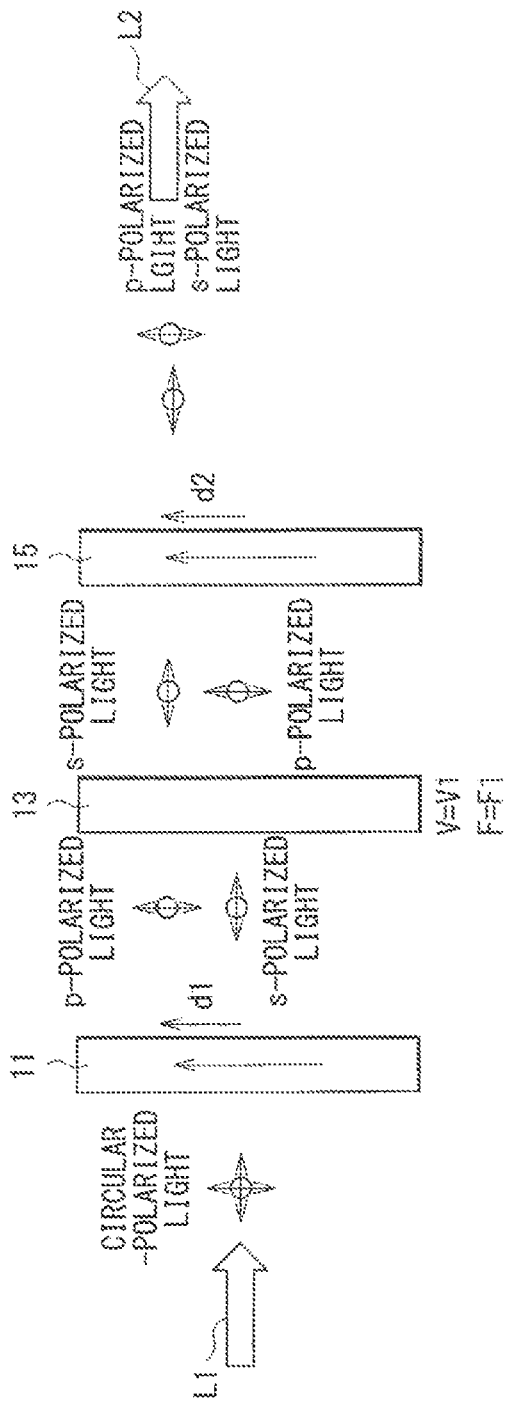

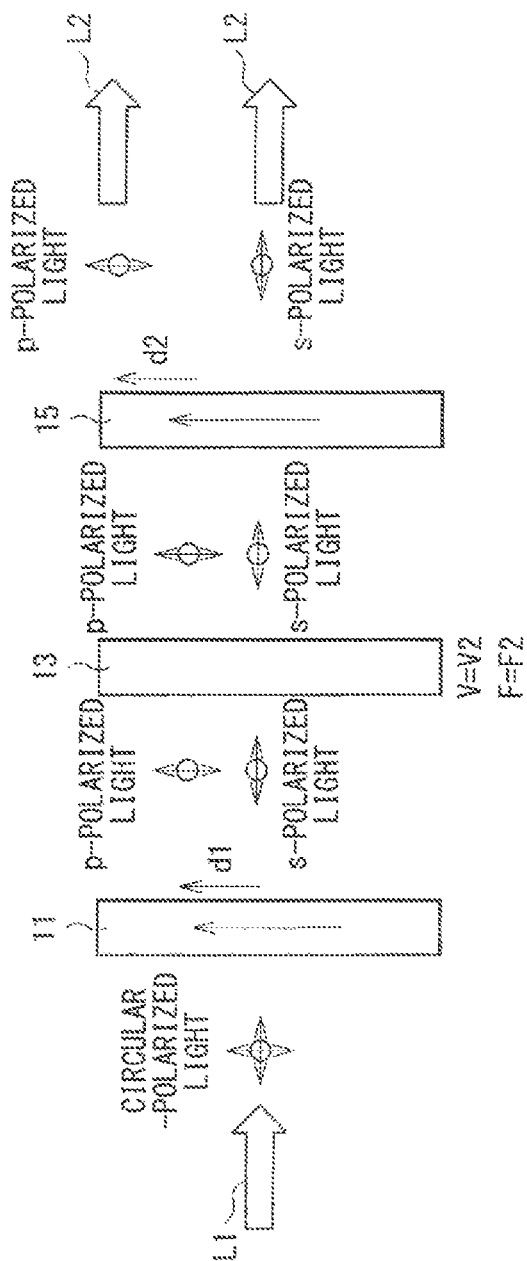
[FIG. 8B]

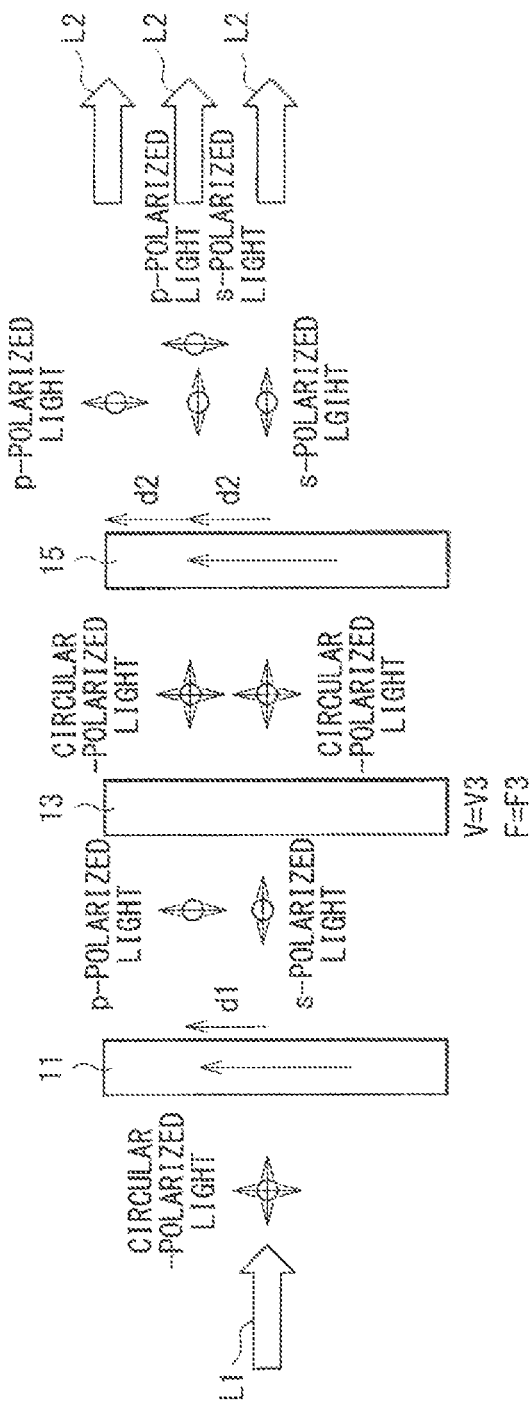
[FIG. 8C]

[ FIG. 9A ]
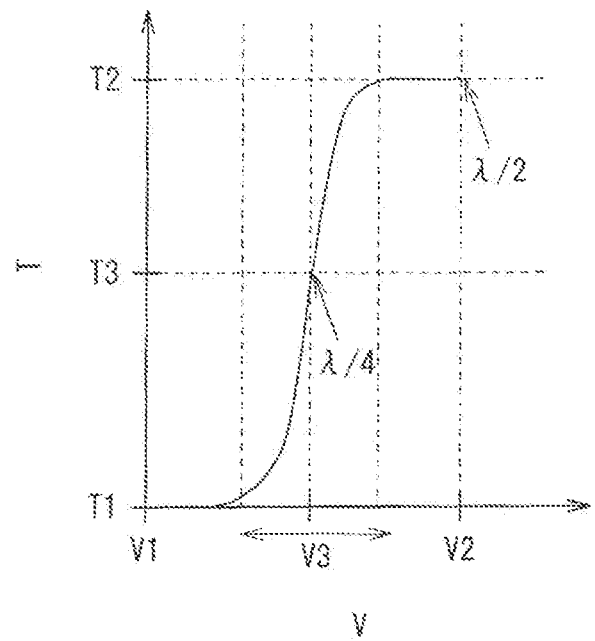
[ FIG. 9B ]
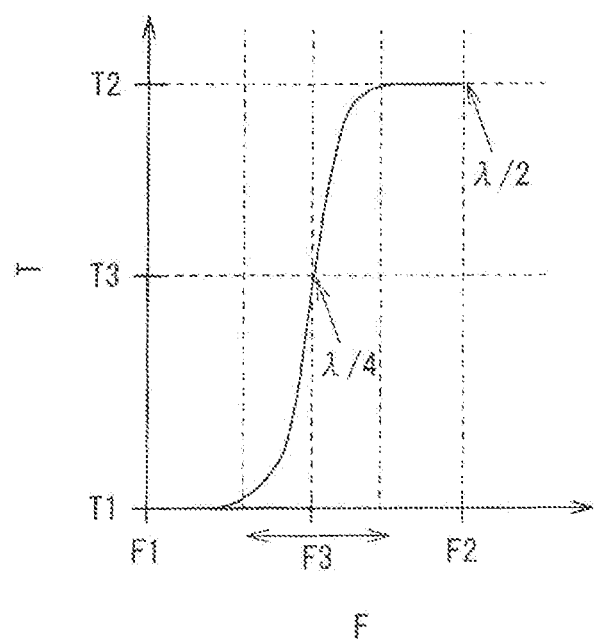

[ FIG. 10 ]
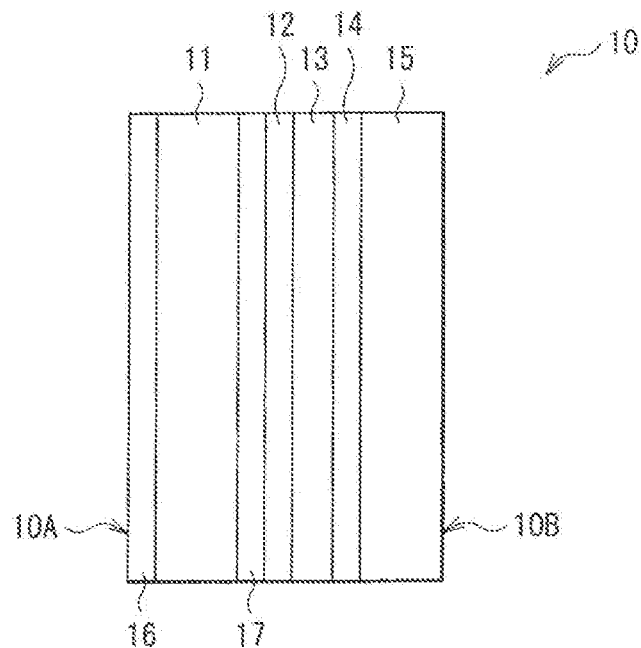
[ FIG. 11 ]
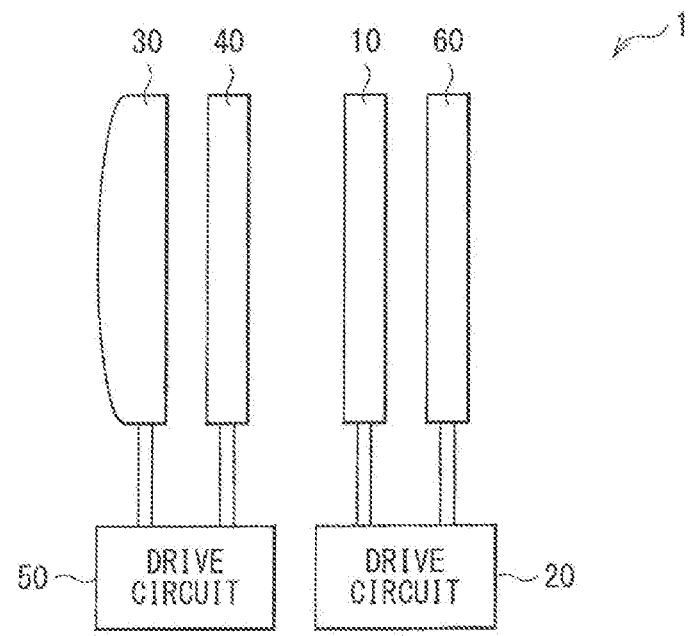

[ FIG. 12 ]
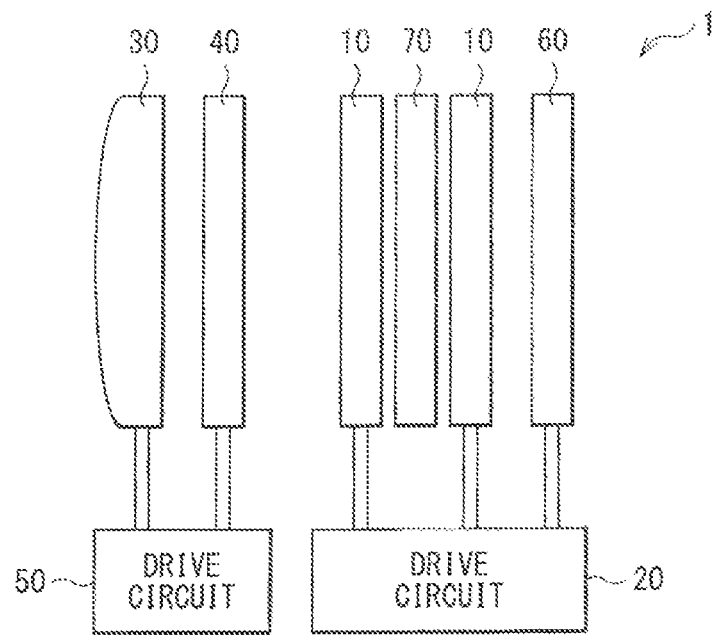
[ FIG. 13 ]
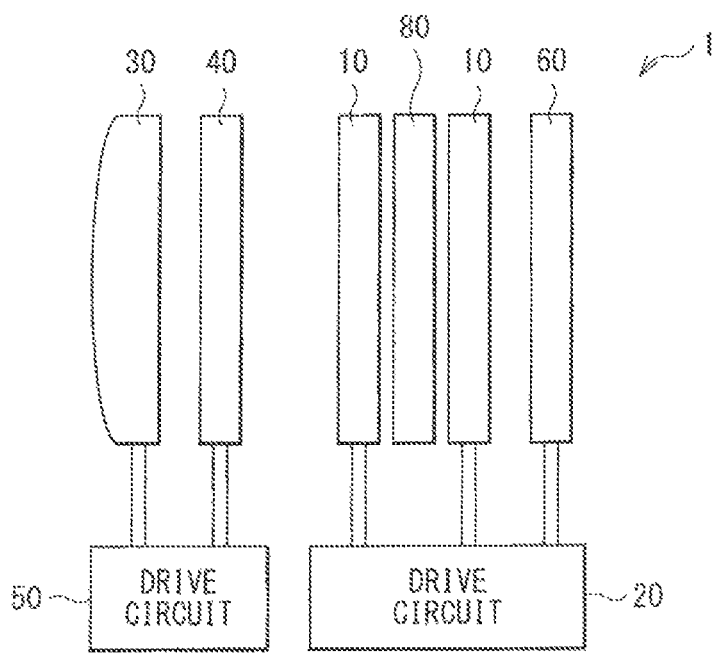

[ FIG. 14 ]
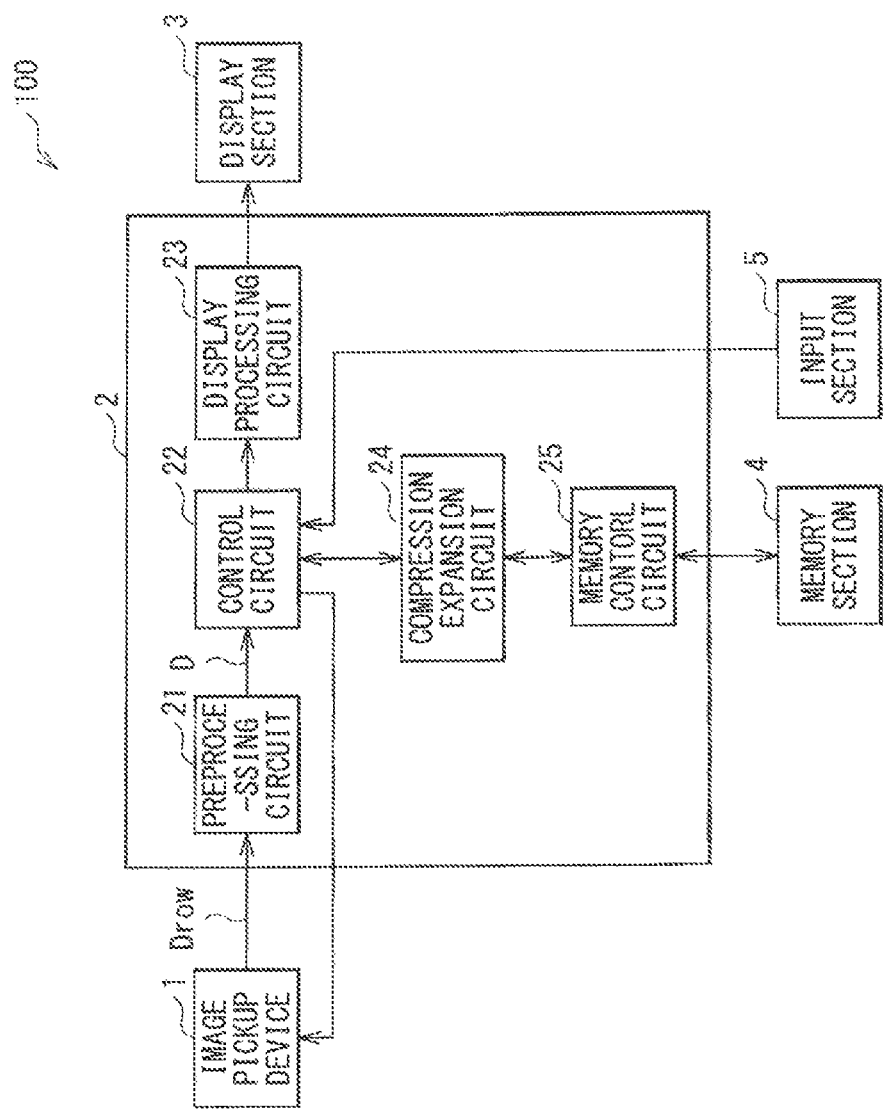

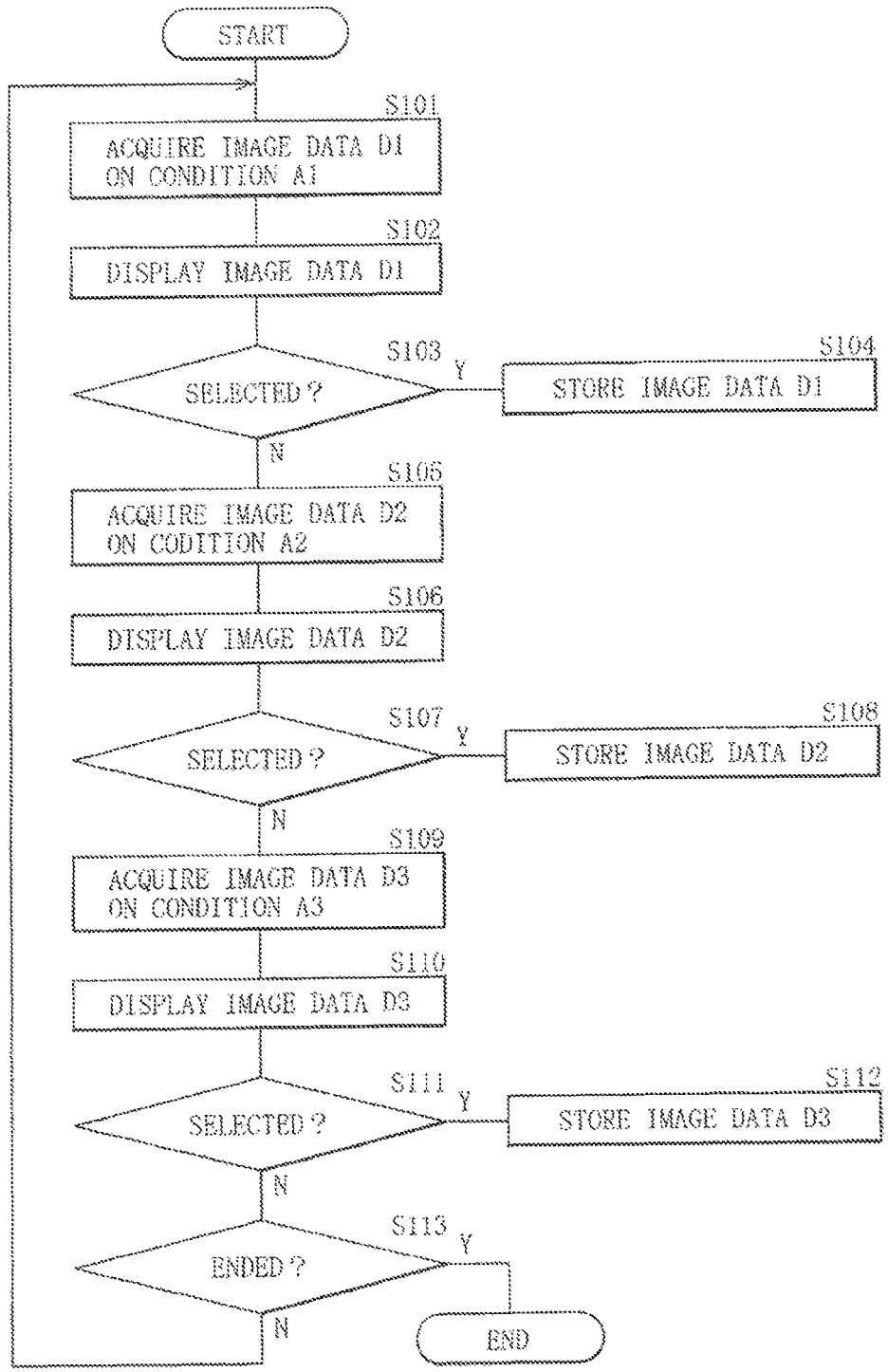
[FIG. 15]

[ FIG. 16 ]
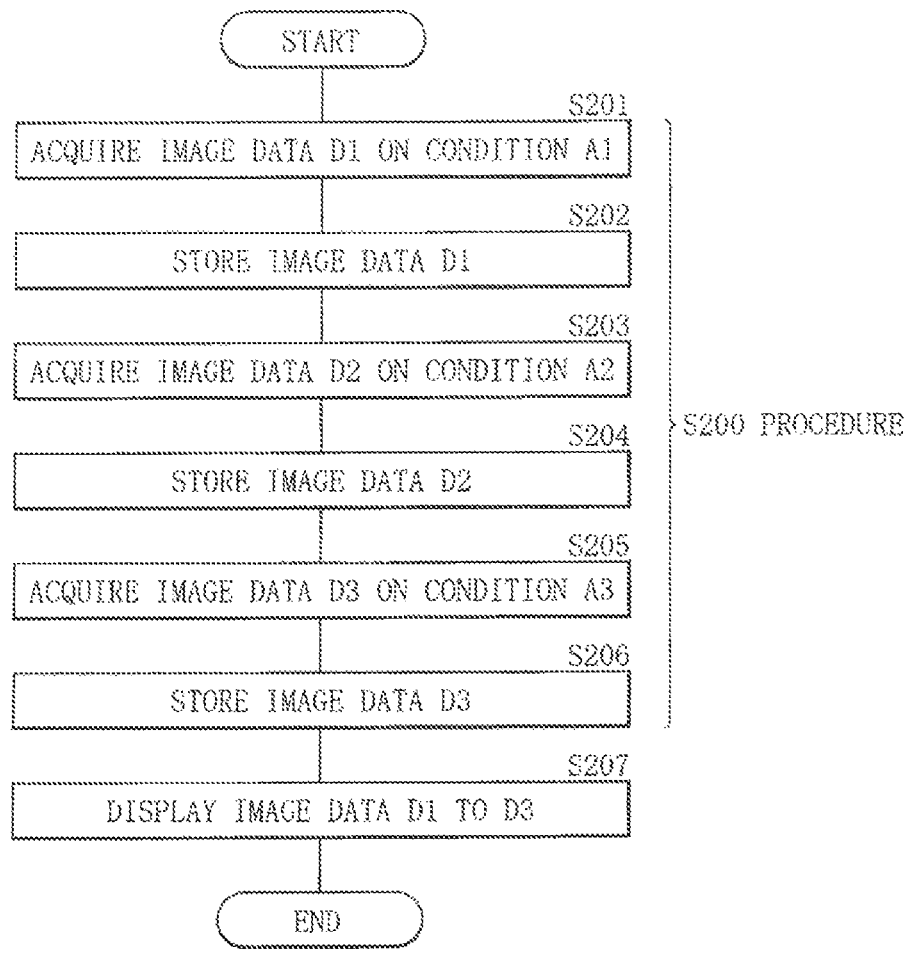

[ FIG. 17 ]
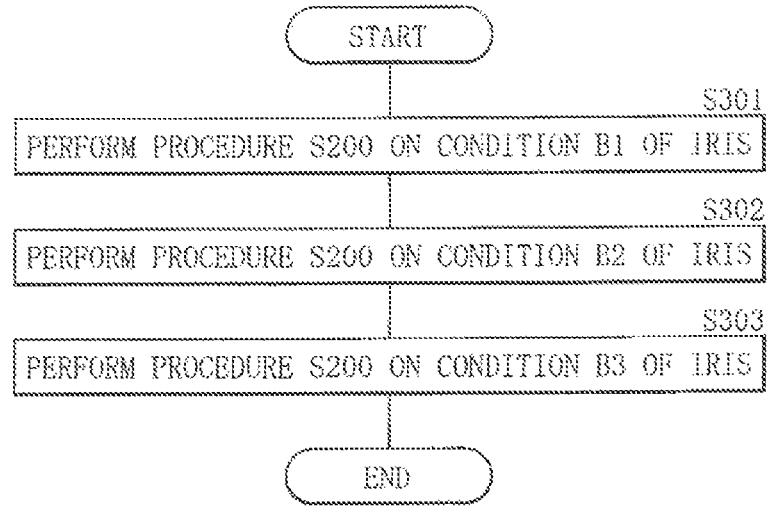
[ FIG. 18 ]
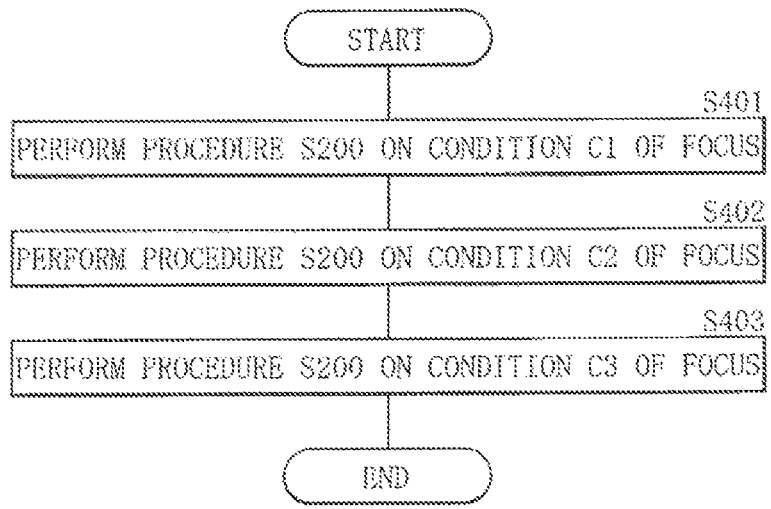

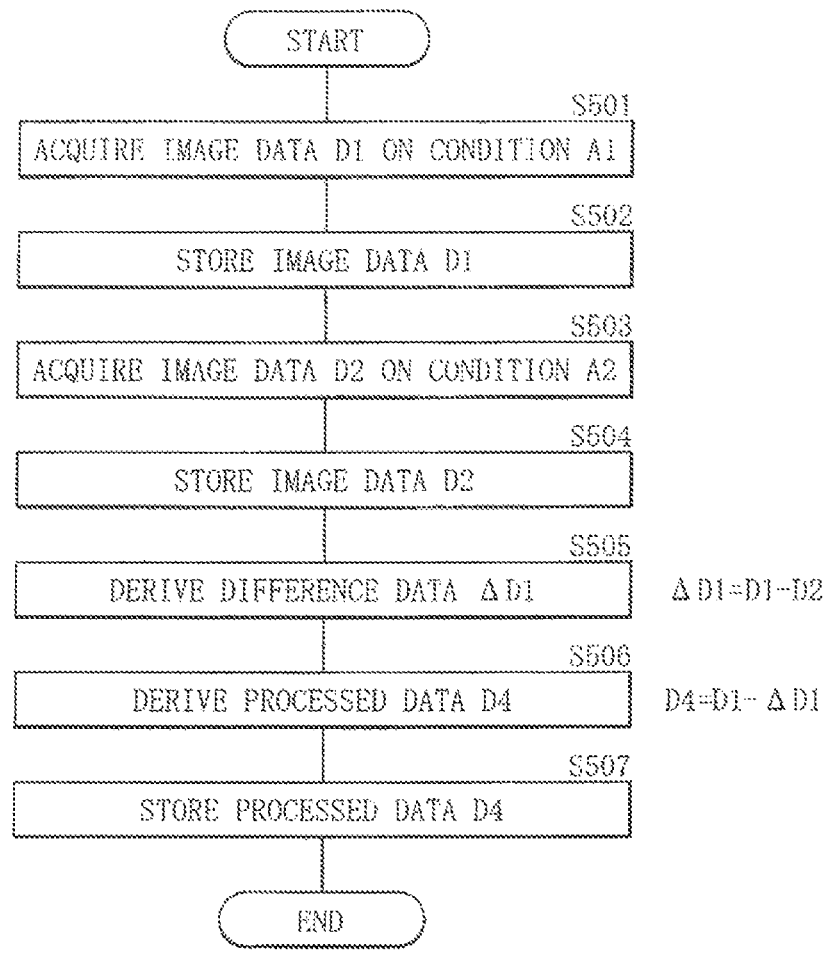
[FIG. 19]

[ FIG. 20 ]
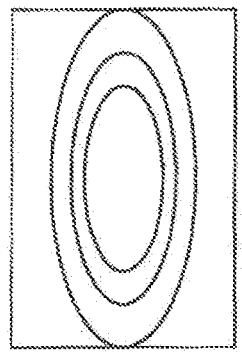
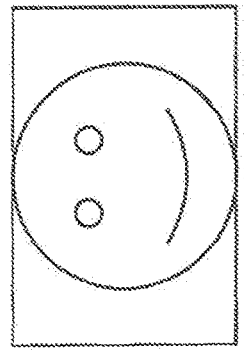
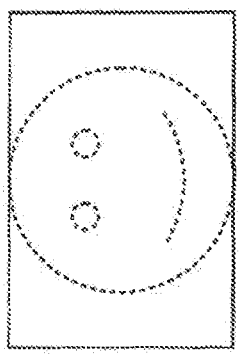
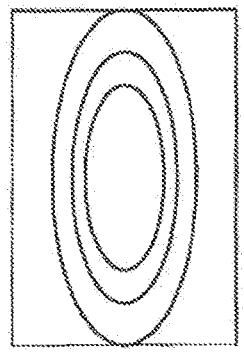
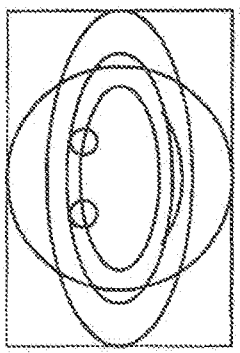
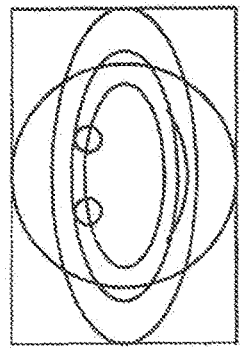

[FIG. 21]
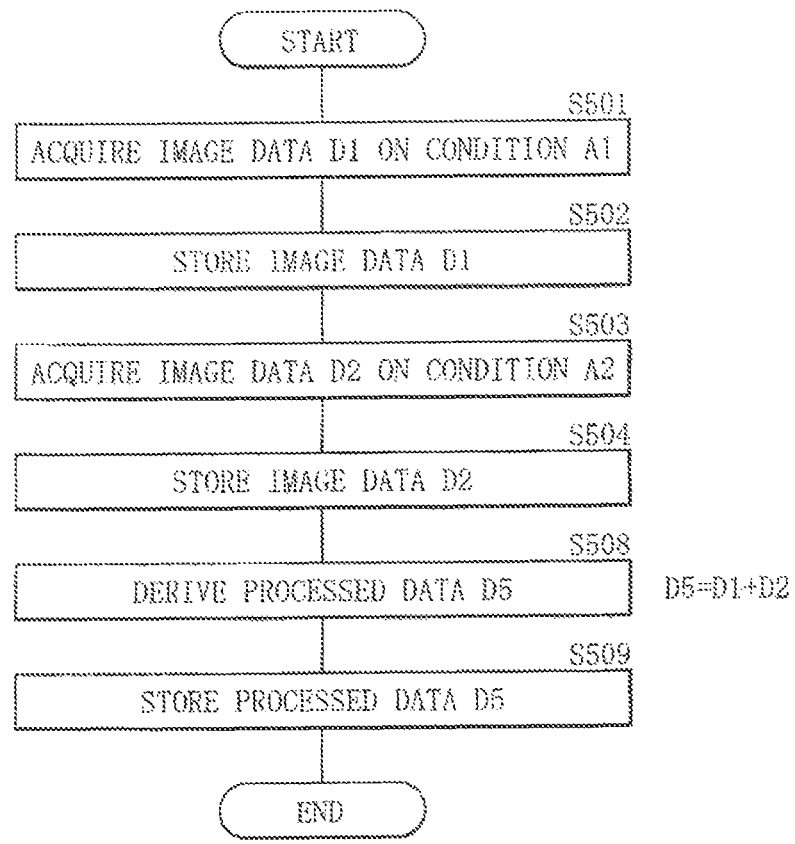

[FIG. 22]
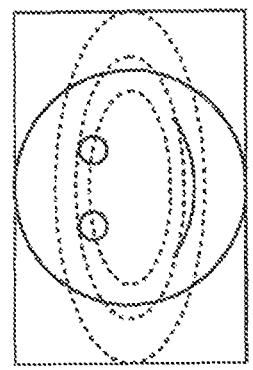
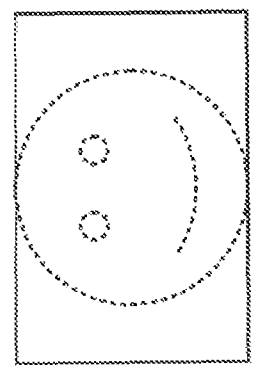
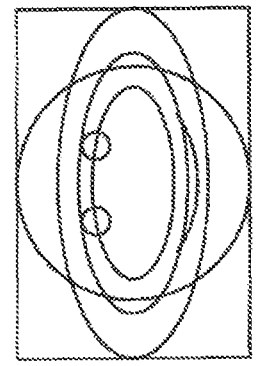

[FIG. 23]
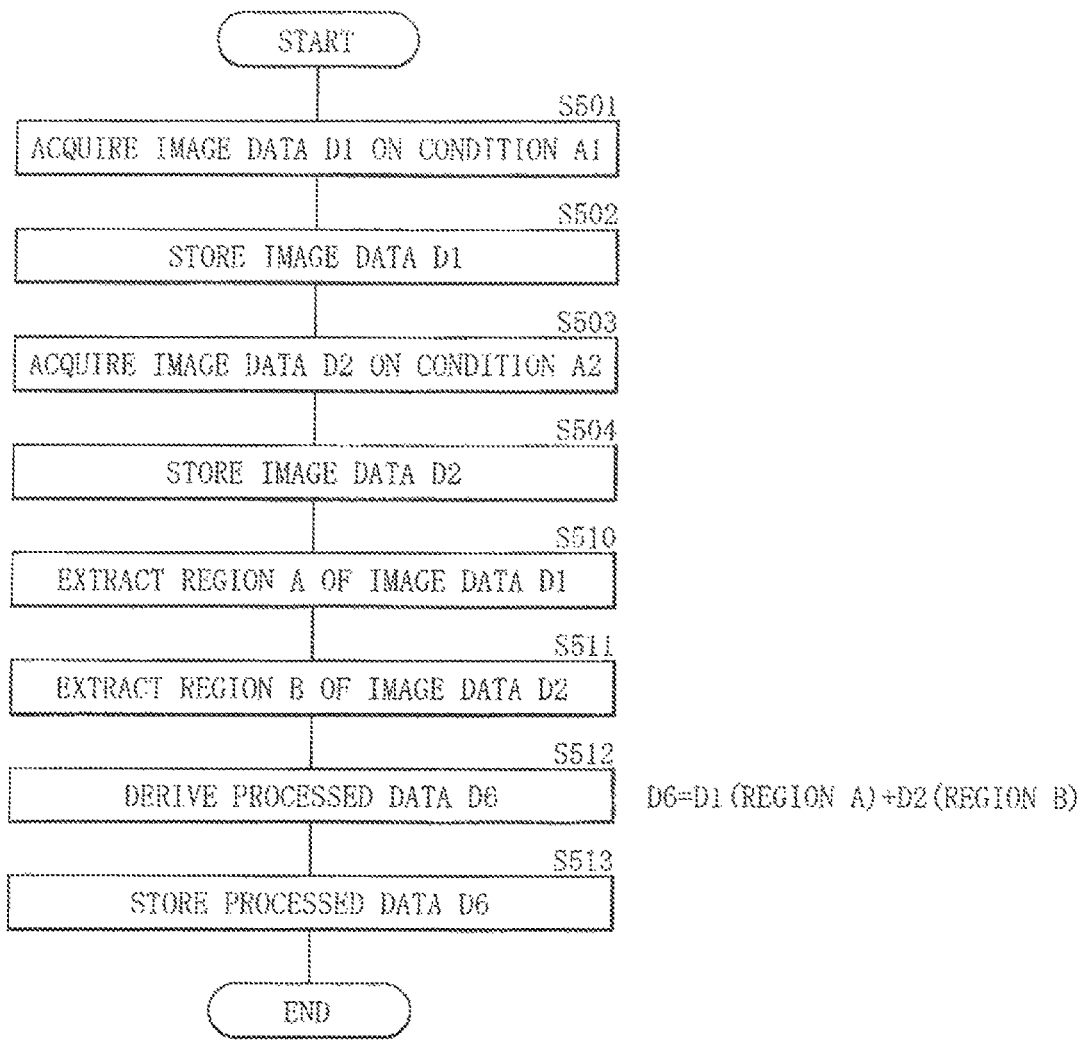

[FIG. 24]
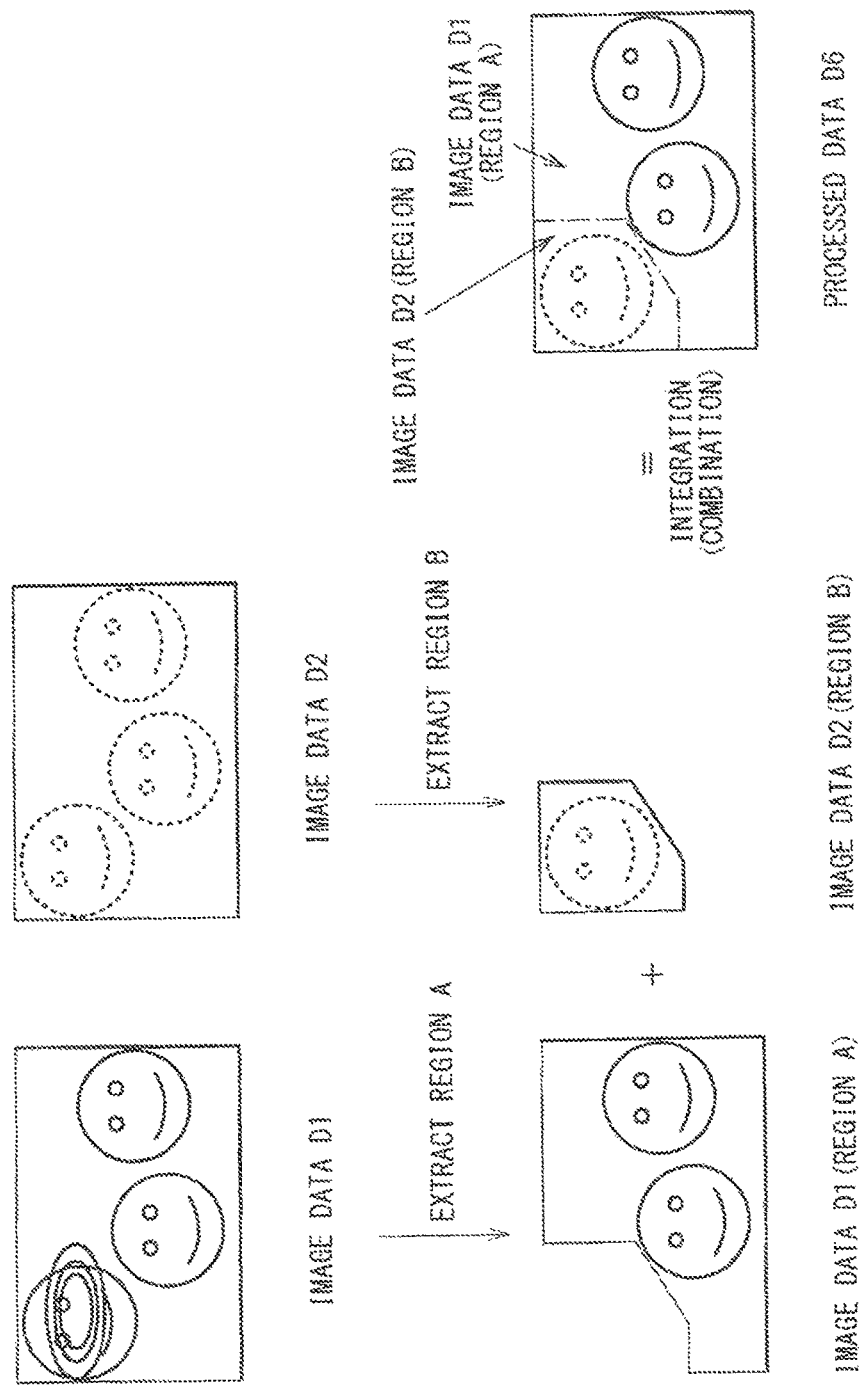

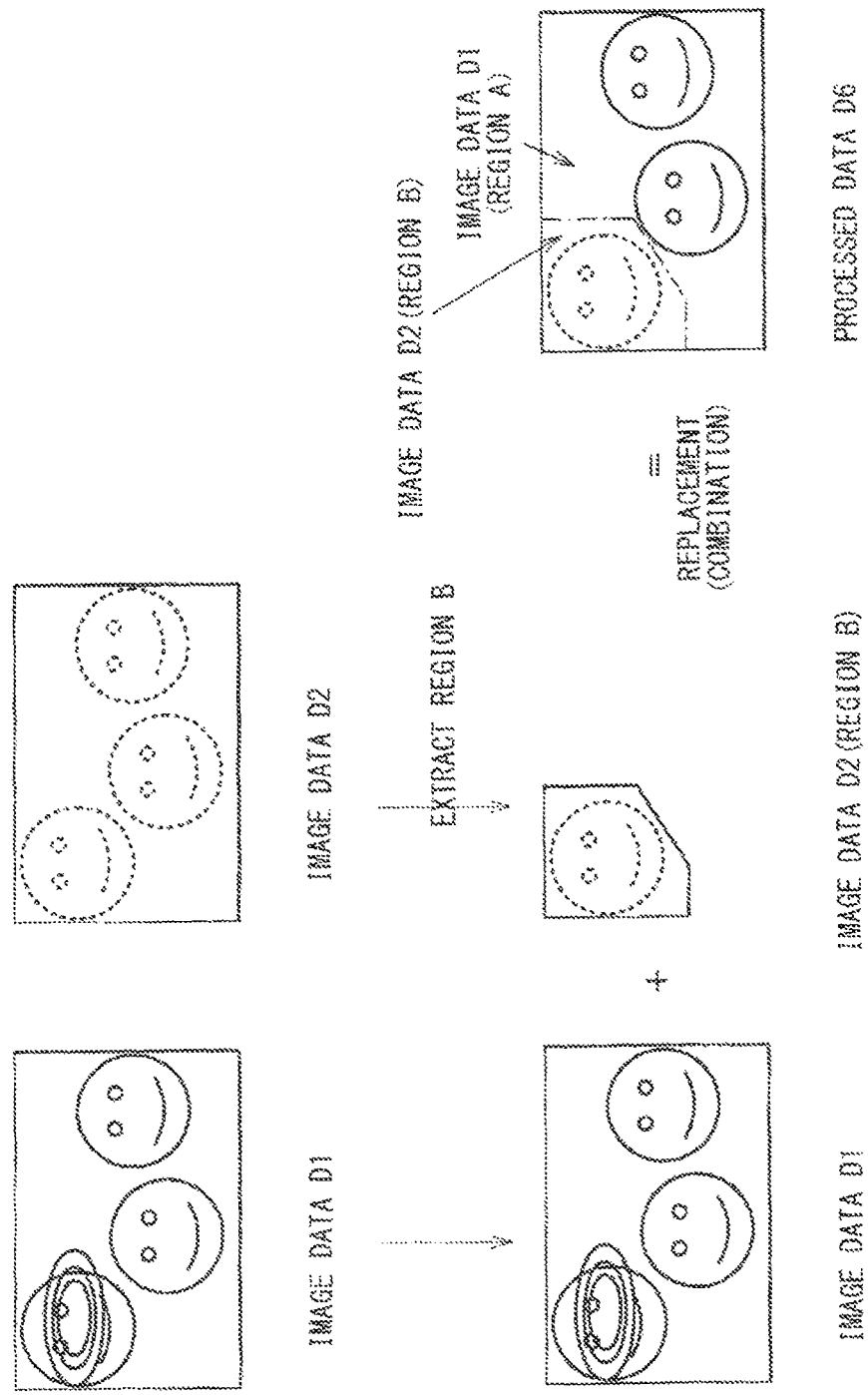
[FIG. 25]

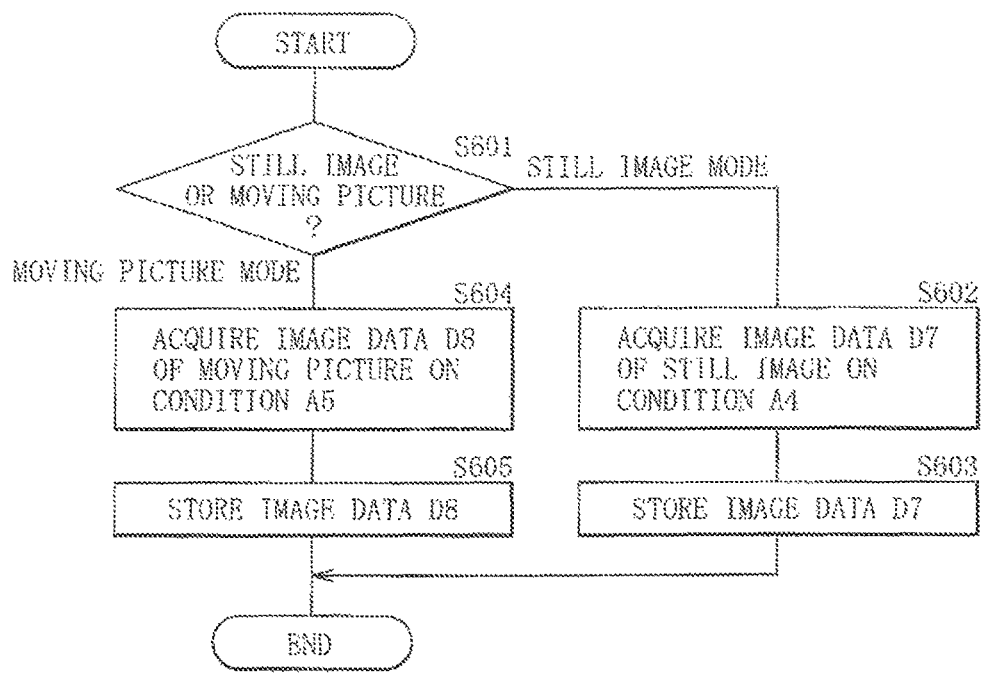
[ FIG. 26 ]

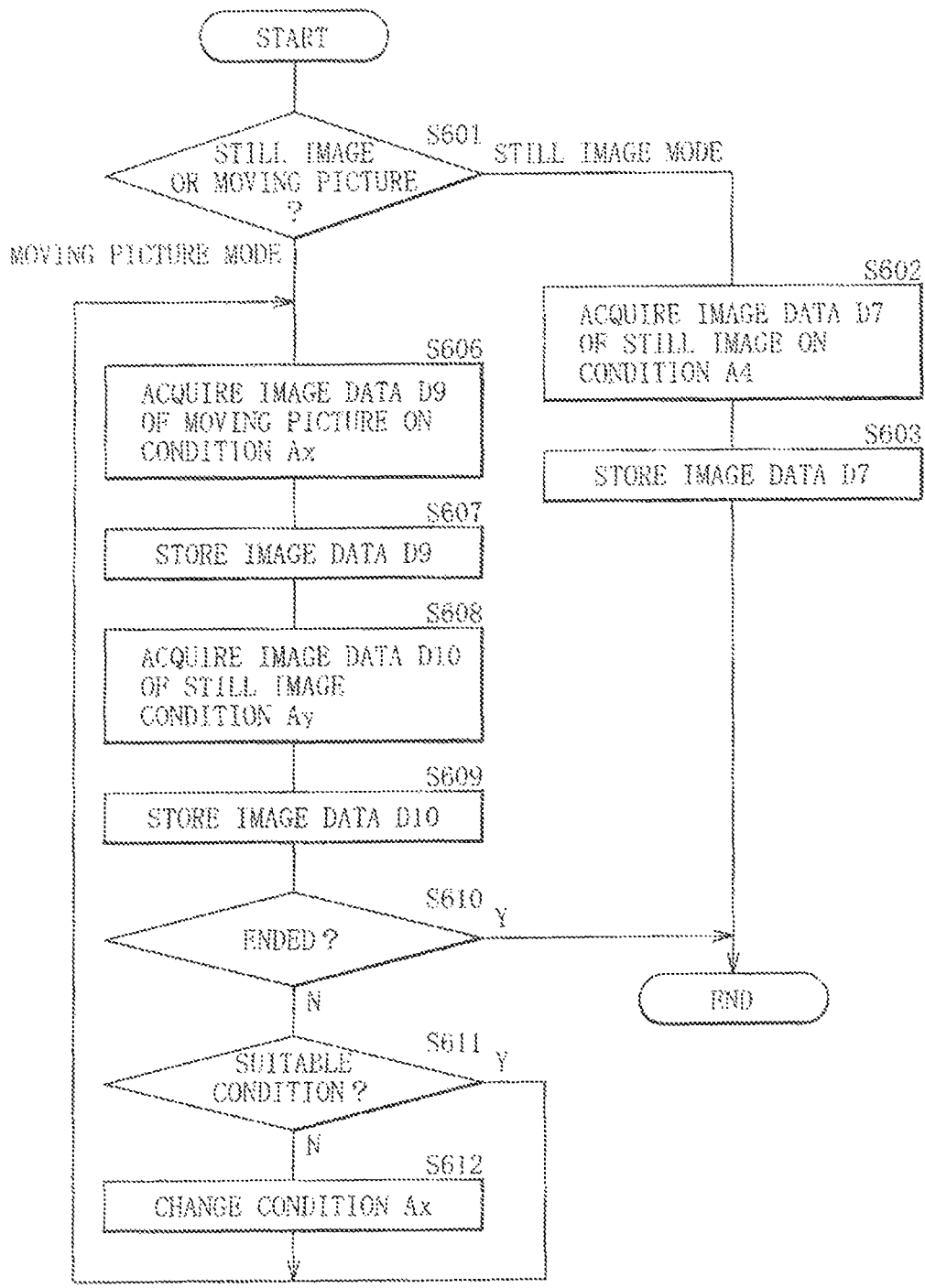

OPTICAL LOW PASS FILTER, IMAGE PICKUP DEVICE, AND IMAGE PICKUP APPARATUS

CROSS REFERENCE TO RELATED APPLICATIONS

This application claims the benefit of Japanese Priority Patent Application JP 2013-176478 filed Aug. 28, 2013, the entire contents of which are incorporated herein by reference.

TECHNICAL FIELD

The present technology relates to an optical low pass filter, and to an image pickup device and an image pickup apparatus each provided with the optical low pass filter.

BACKGROUND ART

In a digital camera or a video camera that is one of image pickup apparatuses, a charge coupled device (CCD) image sensor or a complementary metal-oxide semiconductor (CMOS) image sensor is widely used as an image pickup device. In the image pickup device, an image pickup element in which a plurality of photoelectric conversion elements are two-dimensionally arranged with a predetermined distance (hereinafter, referred to as "pixel pitch") and a color filter array disposed on a light incident surface of the image pickup element are provided. The image pickup device discretely samples object light that has entered the image pickup device through an image pickup lens by the image pickup element and the color filter array, to obtain color image data.

The image pickup device has a resolution limit (Nyquist frequency) defined by a pixel pitch of the image pickup element or a color arrangement pitch of the color filter array. Therefore, when object light that has a high frequency component equal to or higher than the Nyquist frequency enters the image pickup device, the high frequency component equal to or higher than the Nyquist frequency becomes a folded component in a real space, and thus stripe-like pattern (moiré) in which color of the image data and luminance are periodically changed may occur. Accordingly, an optical low pass filter (OLPF) in which the Nyquist frequency is set to a cutoff frequency is typically disposed between the image pickup lens and the image pickup element, and the high frequency component of light entering the image pickup element is removed by the OLPF.

In a camera capable of capturing both a still image and a moving image, a reading pitch is different between in a still image mode and in a moving picture mode, and the Nyquist frequency is accordingly different therebetween. In the moving picture mode, normally, the reading pitch is larger than the reading pitch in the still image mode, and the Nyquist frequency is smaller than the Nyquist frequency in the still image mode. Therefore, in the moving picture mode, moiré is more easily generated from a low frequency region than in the still image mode. However, in the past, a high priority is given to resolution of the still image, and the cutoff frequency of the OLPF is set to the Nyquist frequency in the still image mode. Thus, an OLPF optimal to both modes is not provided.

There is proposed that an OLPF having an optimal cutoff frequency is provided for each mode, and the OLPF is switched depending on the modes (see PTL1). Moreover, there is provided that, in an OLPF in which a TN liquid crystal is sandwiched between, a pair of liquid crystal plates each having birefringence, the TN liquid crystal is driven to be turned on or off to change a ps separation width of transmitted light of the OLPF into two modes (see PTLs 2 and 3). Note that changing the ps separation width makes it possible to change the cutoff frequency.

CITATION LIST

Patent Literature

[PTL 1] JP 2000-333049
[PTL 2] WO2007/083783
[PTL 3] JP2007-94276

SUMMARY

Technical Problem

In the above-described method, however, the cutoff frequency is fixed. Therefore, the cutoff frequency is not allowed to be changed to a cutoff frequency different from a cutoff frequency initially set. In the case where the cutoff frequency different from the initial cutoff frequency is necessary, it is necessary to add another OLPF or replace the existing OLPF with another OLPF.

It is desirable to provide an optical low pass filter having a structure in which a cutoff frequency is allowed to be changed without preparing new optical component, and to provide an image pickup device and an image pickup apparatus that include the optical low pass filter.

Solution to Problem

According to a first embodiment, the present disclosure is directed to An image pickup device including; an optical filter including a first birefringent member; a second birefringent member; a liquid crystal layer disposed between the first and second birefringent members and configured to control polarization; and an electrode configured to apply an electric field to the liquid crystal layer; and a drive circuit configured to apply an intermediate voltage or an intermediate frequency to the electrode.

According to another embodiment, the disclosure is directed to an image pickup apparatus including: an optical filter including a first birefringent member; a second birefringent member; a liquid crystal layer disposed between the first and second birefringent members and configured to control polarization; and an electrode configured to apply an electric field to the liquid crystal layer; an image pickup element configured to output image data corresponding to light transmitted through the optical filter; and circuitry configured to drive the optical filter and the image pickup element, wherein the circuitry is applies an intermediate voltage or an intermediate frequency to the electrode.

According to another embodiment, the present disclosure is directed to an optical filter including: a first birefringent member; a second birefringent member; a liquid crystal layer disposed between the first and second birefringent members and configured to control polarization; and an electrode configured to apply an electric field to the liquid crystal layer, wherein the first and second birefringent members and the liquid crystal layer are configured to generate a plurality of peaks in a point image intensity distribution of light transmitted through the optical filter based on an intermediate voltage or an intermediate frequency applied to the electrode.

According to another embodiment, the disclosure is directed to a control device including: a drive circuit configured to apply an electric field to an optical filter, the optical filter including a first birefringent member; a second birefringent member; a liquid crystal layer disposed between the first and second birefringent members and configured to control polarization; and an electrode configured to apply the electric field to the liquid crystal layer, wherein the drive circuit configured to apply an intermediate voltage or an intermediate frequency to the electrode.

According to each of the embodiments discussed above, the intermediate voltage may be a voltage between a voltage at a rising position and a voltage at a falling position of a polarization conversion efficiency curve of the liquid crystal layer, and the intermediate frequency may be a frequency between a frequency at the rising position and a frequency at the falling position of the polarization conversion efficiency curve of the liquid crystal layer.

Advantageous Effects of Invention

According to the optical low pass filter of the embodiment of the present technology, three or four peaks are generated in the point image intensity distribution of the transmitted light. Therefore, the values of the peaks are varied according to the magnitude of the intermediate voltage or the intermediate frequency applied to the electrode, which makes it possible to change the cutoff frequency. Accordingly, the optical low pass filter according to the embodiment of the technology has a structure capable of changing the cutoff frequency without preparing new optical component. Note that the effects of the present technology are not necessarily limited to those described here, and may be any effects described in the present specification.

According to the image pickup device and the image pickup apparatus according to the respective embodiments of the technology, the intermediate voltage between a voltage at the rising position and a voltage at the falling position of the polarization conversion efficiency curve of the liquid crystal layer or the intermediate frequency between a frequency at the rising position and a frequency at the falling position is applied to the electrode. When the magnitude of the intermediate voltage or the intermediate frequency applied to the electrode is changed, the polarization conversion efficiency of the liquid crystal layer is changed. As a result, three or four peaks are generated in the point image intensity distribution of the transmitted light of the optical low pass filter, as well as the values of the peaks are varied. Therefore, the values of the peaks are varied according to the magnitude of the intermediate voltage or the intermediate frequency applied to the electrode, which makes it possible to change the cutoff frequency. Accordingly, the image pickup device and the image pickup apparatus according to the respective embodiments of the technology each have a configuration capable of changing the cutoff frequency without preparing new optical component. Note that the effects of the present technology are not necessarily limited to those described here, and may be any effects described in the present specification.

It is to be understood that both the foregoing general description and the following detailed description are exemplary, and are provided to provide further explanation of the technology as claimed.

BRIEF DESCRIPTION OF DRAWINGS

The accompanying drawings are included to provide a further understanding of the technology, and are incorporated in and constitute a part of this specification. The drawings illustrate embodiments and, together with the specification, serve to explain the principles of the technology.

FIG. 1 is a diagram illustrating an example of a schematic structure of an optical low pass filter according to a first embodiment of the technology.

FIG. 2 is a diagram illustrating an example of an optical axis of a pair of birefringent plates in FIG. 1.

FIG. 3A is a diagram illustrating an example of a polarization conversion efficiency curve (V-T curve) of a liquid crystal layer in FIG. 1.

FIG. 3B is a diagram illustrating an example of a polarization conversion efficiency curve (F-T curve) of the liquid crystal layer in FIG. 1.

FIG. 4A is a diagram illustrating an example of a function of the optical low pass filter in FIG. 1.

FIG. 4B is a diagram illustrating an example of the function of the optical low pass filter in FIG. 1.

FIG. 4C is a diagram illustrating an example of the function of the optical low pass filter in FIG. 1.

FIG. 5A is a diagram illustrating an example of point image intensity distribution of transmitted light in FIG. 4B, together with, spread of a point image on a picture.

FIG. 5B is a diagram illustrating an example of point image intensity distribution of transmitted light in FIG. 4A, together with spread of a point image on a picture.

FIG. 5C is a diagram illustrating an example of point image intensity distribution of transmitted light in FIG. 4C, together with spread of a point image on a picture.

FIG. 5D is a diagram illustrating an example of the point image intensity distribution of the transmitted light in FIG. 4C, together with spread of the point image on a picture.

FIG. 6 is a diagram illustrating an example of modulation transfer function (MTF) in FIG. 5A to FIG. 5D.

FIG. 7 is a diagram illustrating a modification of the optical axis of the pair of birefringent plates in FIG. 1.

FIG. 8A is a diagram illustrating an example of a function of the optical low pass filter in FIG. 7.

FIG. 8B is a diagram illustrating an example of a function of the optical low pass filter in FIG. 7.

FIG. 8C is a diagram illustrating an example of a function of the optical low pass filter in FIG. 7.

FIG. 9A is a diagram illustrating a modification of a polarization conversion efficiency curve (V-T curve) of a liquid crystal layer in FIG. 1 or FIG. 7.

FIG. 9B is a diagram illustrating a modification of a polarization conversion efficiency curve (F-T curve) of the liquid crystal layer in FIG. 1 or FIG. 7.

FIG. 10 is a diagram illustrating a modification of the optical low pass filter in FIG. 1 or FIG. 7.

FIG. 11 is a diagram illustrating an example of a schematic structure of an image pickup device according to a second embodiment of the technology.

FIG. 12 is a diagram illustrating a modification of the schematic structure of the image pickup device in FIG. 11.

FIG. 13 is a diagram illustrating a modification of the schematic structure of the image pickup device in FIG. 11.

FIG. 14 is a diagram illustrating an example of a schematic configuration of an image pickup apparatus according to a third embodiment of the technology.

FIG. 15 is a diagram illustrating an example of an image pickup procedure in the image pickup apparatus in FIG. 14.

FIG. 16 is a diagram illustrating an example of the image pickup procedure in the image pickup apparatus in FIG. 14.

FIG. 17 is a diagram illustrating an example of the image pickup procedure in the image pickup apparatus in FIG. 14.

FIG. 18 is a diagram illustrating an example of the image pickup procedure in the image pickup apparatus in FIG. 14.

FIG. 19 is a diagram illustrating an example of the image pickup procedure in the image pickup apparatus in FIG. 14.

FIG. 20 is a diagram illustrating a specific example of the procedure in FIG. 19.

FIG. 21 is a diagram illustrating an example of the image pickup procedure in the image pickup apparatus in FIG. 14

FIG. 22 is a diagram illustrating a specific example of the procedure in FIG. 21.

FIG. 23 is a diagram illustrating an example of the image pickup procedure in the image pickup apparatus in FIG. 14

FIG. 24 is a diagram illustrating a specific example of the procedure in FIG. 21.

FIG. 25 is a diagram illustrating a specific example of the procedure in FIG. 21.

FIG. 26 is a diagram illustrating an example of the image pickup procedure in the image pickup apparatus in FIG. 14

FIG. 27 is a diagram illustrating an example of the image pickup procedure in the image pickup apparatus in FIG. 14

DESCRIPTION OF EMBODIMENTS

Hereinafter, some embodiments of the technology will be described in detail with reference to drawings. Note that description will be given in the following order.

1. First Embodiment (Optical Low Pass Filter)

An example in which separation directions of image in two birefringent plates are aligned
 As example of using a TN liquid crystal
2. Modification of first embodiment (optical low pass filter)
 2.1 First modification
 An example in which separation directions of image in two birefringent plates are opposite to each other
 2.2 Second modification
 An example of using a VA liquid crystal
 2.3 Third modification
 An example of adding an AR layer and the like
3. Second embodiment (image pickup device)
 An example of using one optical low pass filter
4. Modification of second embodiment (image pickup device)
 An example of using two optical low pass filters
5. Third embodiment (image pickup apparatus)

1. First Embodiment (Structure)

FIG. 1 illustrates an example of a schematic structure of an optical low pass filter 10 according to a first embodiment of the technology. The optical low pass filter 10 removes component of high spatial frequency contained in object light, and is driven by a drive circuit 20 to change a cutoff frequency fc. The optical low pass filter 10 changes the cutoff frequency fc by a method (a peak value modulation method) different from an existing method (a separation width modulation method) that change a ps separation width of transmitted light. Note that the peak value modulation method will be described in detail later.

The optical low pass filter 10 includes a pair of birefringent plates 11 and 15 each having birefringence, and a liquid crystal layer 13 disposed between the pair of birefringent plates 11 and 15. The optical low pass filter 10 further includes electrodes 12 and 14 each applying an electric field to the liquid crystal layer 13. Note that, for example, the optical low pass filter 10 may include an alignment film that regulates alignment of the liquid crystal layer 13. The electrodes 12 and 14 are disposed so as to face each other with the liquid crystal layer in between. Each of the electrodes 12 and 14 is configured of one sheet electrode. Note that one or both of the electrodes 12 and 14 may be configured of a plurality of partial electrodes.

The birefringent plate 11 is disposed on a light incident side of the optical low pass filter, and for example, an outside surface of the birefringent plate 11 may be a light incident surface 10A. Incident light L1 is light entering the light incident surface 10A from an object side. For example, the birefringent plate 11 may be disposed so that an optical axis of the incident light L1 is parallel to a normal 11A of the birefringent plate 11 (or the light, incident surface 10A). The birefringent plate 15 is disposed on a light emission-side of the optical low pass filter 10, and for example, an outside surface of the birefringent plate 15 may be a light emission surface 10B. Transmitted light L2 of the optical low pass filter 10 is light emitted from the light emission surface 10B to the outside. The birefringent plate 11, the electrode 12, the liquid crystal layer 13, the electrode 14, and the birefringent plate 15 are stacked in this order from the light incident side. A normal of each of the electrode 12, the liquid crystal layer 13, the electrode 14, and the birefringent plate 15 is parallel to the normal 11A.

FIG. 2 illustrates an example of an optical axis of each of the pair of birefringent plates 11 and 15 in the optical low pass filter 10. Each of the birefringent plates 11 and 15 has the birefringence and a uniaxial crystal structure. The birefringent plates 11 and 15 each have a function of utilizing the birefringence to perform ps separation on circular-polarized light. For example, the birefringent plates 11 and 15 each may be formed of liquid crystal calcite, or lithium niobate. In this case, a separation factor of the lithium niobate is about 6.4 times larger than that of the liquid crystal. Therefore, the lithium niobate is smaller in thickness necessary for obtaining a certain separation width than the liquid crystal.

In the birefringent plates 11 and 15, separation directions of image are opposite to each other. An optical axis AX1 of the birefringent plate 11 and an optical axis AX2 of the birefringent plate 15 intersect with each other in a plane parallel to the normal 11A of the light incident surface 10A. An angle θ1 formed by the optical axis AX1 and the optical axis AX2 may be, for example, about 90 degrees. Further, the optical axes AX1 and AX2 obliquely intersect with the normal 11A of the incident surface 10A. An angle θ2 formed by the optical axis AX1 and the normal 11A may be, for example, smaller than 90 degrees in a counterclockwise direction with the normal 11A as a reference, and may be, for example, about 45 degrees. An angle θ3 formed by the optical axis AX2 and the normal 11A may be, for example, larger than 90 degrees and smaller than 180 degrees in a counterclockwise direction with the normal 11A as a reference, and may be, for example, 135 degrees (180 degrees-45 degrees), FIG. 3A illustrates an example of a polarization conversion efficiency curve (V-T curve) of the liquid crystal layer 13. FIG. 3B illustrates an example of a polarization conversion efficiency curve (F-T curve) of the liquid crystal layer 13. In FIG. 3A, a lateral axis indicates a voltage V (constant frequency) applied between the electrodes 12 and 14. In FIG. 3B, a lateral axis indicates a frequency F of the voltage (constant voltage) applied between the electrodes 12 and 14. In FIG. 3A and FIG. 3B, a vertical axis indicates polarization conversion efficiency T. The polarization conversion efficiency T is obtained by multiplying, by 100, a value that is obtained by dividing a phase difference applied to linear-polarized light by 90 degrees. 0% of the polarization conversion efficiency T indicates that no phase difference is applied to the linear-polarized light, and for example, may indicate that the linear-polarized light passes through a medium without being changed in a polarization direction. 100% of the polarization conversion efficiency T indicates that a phase difference of about 90 degrees is applied to the linear-polarized light, and for example, may indicate that p-polarized light is converted into s-polarized light or s-polarized light is converted into p-polarized light, and then passes through a medium. 50% of the polarization conversion efficiency T indicates that a phase difference of about 45 degrees is applied to the linear-polarized light, and for example, may indicate that p-polarized light or s-polarized light is converted into circular-polarized light and then passes through a medium.

As illustrated in FIG. 3A, in the liquid crystal layer 13, when a voltage V1 is applied between the electrodes 12 and 14, the polarization conversion efficiency T becomes T2, and when a voltage V2 (V1<V2) is applied between the electrodes 12 and 14, the polarization conversion efficiency T becomes T1. T2 indicates 100% and T1 indicates 0%. As illustrated in FIG. 3A, in the liquid crystal layer 13, further, when a voltage V3 (V1<V3<V2) is applied between the electrodes 12 and 14, the polarization conversion efficiency T becomes T3. T3 is a value larger than 0% and smaller than 100%. In FIG. 3A, a case where the voltage V3 is a voltage at which T3 becomes 50% is exemplified. Here, the voltage V1 is a voltage smaller than a voltage at a falling position of the polarization conversion efficiency curve. The voltage V2 is a voltage larger than a voltage at a rising position of the polarization conversion efficiency curve. The voltage V3 is a voltage that is larger than the voltage at the falling position of the polarization conversion efficiency curve and is smaller than the voltage at the rising position of the polarization conversion efficiency curve. The voltage V3 is a voltage between a voltage at the falling position and a voltage at the rising position of the polarization conversion efficiency curve (in other words, is an intermediate voltage).

As illustrated in FIG. 3B, in the liquid crystal layer 13, when a voltage of a frequency F1 is applied between the electrodes 12 and 14, the polarization conversion efficiency T becomes T2, and when a voltage of a frequency F2 (F1<F2) is applied between the electrodes 12 and 14, the polarization conversion efficiency T becomes T1. Further, as illustrated in FIG. 3B, in the liquid crystal layer 13, when a voltage of a frequency F3 (F1<F3<F2) is applied between the electrodes 12 and 14, the polarization conversion efficiency T becomes T3. In FIG. 3B, a case where the frequency F3 is a frequency at which T3 becomes 50% is exemplified. In this example, the frequency F1 is a frequency smaller than a frequency at the falling position of the polarization conversion efficiency curve. The frequency F2 is a frequency larger than a frequency at the rising position of the polarization conversion efficiency curve. The frequency F3 is a frequency that is larger than the frequency at the falling position of the polarization conversion efficiency curve, and is smaller than the frequency at the rising position of the polarization conversion efficiency curve. The frequency F3 is a frequency between a frequency at the falling position and a frequency at the rising position of the polarization conversion efficiency curve (in other words, is an intermediate frequency).

As described above, the liquid crystal layer 13 controls polarization. Examples of the liquid crystal having the above-described polarization conversion efficiency curve may include a twisted nematic (TN) liquid crystal. The TN liquid crystal is configured of chiral nematic liquid crystal, and has optical rotary power that rotates the polarization direction of passing light along rotation, of the nematic liquid crystal.

(Function)

Next, an optical function of the optical low pass filter 10 (specifically, the pair of birefringent plates 11 and 15 and the liquid crystal layer 13) will be described. FIG. 4A, FIG. 4B, and FIG. 4C each illustrate an example of the function of the optical low pass filter 10. In FIG. 4A, the voltage V between the electrodes 12 and 14 is the voltage V1, or the frequency F between the electrodes 12 and 14 is the frequency F1. In FIG. 4B, the voltage V between, the electrodes 12 and 14 is the voltage V2, or the frequency F between the electrodes 12 and 14 is the frequency F2. In FIG. 4C, the voltage V between the electrodes 12 and 14 is the voltage V3, or the frequency F between the electrodes 12 and 14 is the frequency F3.

(In case where V=V1 and F=F1 (FIG. 4A))

When the circular-polarized incident light L1 enters the birefringent plate 11, the incident light L1 is separated into p-polarized light and s-polarized light with a separation width d1 by birefringence of the birefringent plate 11. When a polarization component oscillating perpendicular to the optical axis AX1 of the birefringent plate 11 is a component of the s-polarized light contained in the incident light L1, the separated s-polarized light travels straightly in the birefringent plate 11 without being affected by the birefringence, and is emitted from a back surface of the birefringent plate 11. A component of the p-polarized light contained in the incident light L1 oscillates in a direction orthogonal to the oscillating direction of the s-polarized light, and thus the p-polarized light is affected by birefringence and obliquely travels in the birefringent plate 11, is refracted at a position shifted by a separation width d2 of the back surface of the birefringent plate 11, and is then emitted from the back surface of the birefringent plate 11. Therefore, the birefringent plate 11 separates the incident light L1 into p-polarized transmitted light L2 and s-polarized transmitted light L2 with the separation width d2.

When the p-polarized light separated by the birefringent plate 11 enters the liquid crystal layer 13 whose polarization conversion efficiency is T2, the p-polarized light is converted into s-polarized light, as well as straightly travels in the liquid crystal layer 13, and is emitted from the back surface of the liquid crystal layer 13. When the s-polarized light separated by the birefringent plate 11 enters the liquid crystal layer 13 whose polarization conversion efficiency is T2, the s-polarized light is converted into p-polarized light, as well as straightly travels in the liquid crystal layer 13, and is emitted from the back surface of the liquid crystal layer 13. Therefore, the liquid crystal layer 13 performs ps conversion on the p-polarized light and the s-polarized light that are separated by the birefringent plate 11, while maintaining a separation width.

When the s-polarized light and the p-polarized light that have passed through the liquid crystal layer 13 enter the birefringent plate 15, the separation width of the s-polarized light and the p-polarized light is changed by the birefringence of the birefringent plate 15. When a polarization component oscillating perpendicular to the optical axis AX2 of the birefringent plate 15 is s-polarized light, the s-polarized light straightly travels in the birefringent plate 15 without being affected by the birefringence, and is emitted from the back surface of the birefringent plate 15. Since the p-polarized light oscillates in a direction orthogonal to the oscillating direction of the s-polarized light, the p-polarized light is affected by the birefringence and obliquely travels in the birefringent plate 15 in a direction opposite to the separation direction of an image in the birefringent plate 11. Further, the p-polarized light is refracted at a position shifted by the separation width d2 of the hack surface of the birefringent plate 15, and is emitted from the hack surface of the birefringent plate 15. Therefore, the birefringent plate 15 separates the s-polarized light and the p-polarized light that have passed through the liquid crystal layer 13 into s-polarized transmitted light L2 and p-polarized transmitted light L2 with a separation width (d1+d2).

(In case of V=V2 and F=F2 (FIG. 4B))

A function to the incident light L1 of the birefringent plate 11 is the same as described above. Therefore, a function of each of the liquid crystal layer 13 and the birefringent plate 15 is described below. When the p-polarized light and the s-polarized light that have been separated by the birefringent plate 11 enter the liquid crystal layer 13 whose polarization conversion efficiency is T1, the p-polarized light and the s-polarized light straightly travel in the liquid crystal layer 13 without being polarized and converted by the liquid crystal layer 13, and are emitted from the back surface of the liquid crystal layer 13. Therefore, the liquid crystal layer 13 has no optical function to the p-polarized light and the s-polarized light that have separated by the birefringent plate 11.

When the s-polarized light and the p-polarized light that have passed through the liquid crystal layer 13 enter the birefringent plate 15, the separation width of the s-polarized light and the p-polarized light is changed by the birefringence of the birefringent plate 15. When a polarization component oscillating perpendicular to the optical axis AX2 of the birefringent plate 15 is the s-polarized light, the s-polarized light straightly travels in the birefringent plate 15 without being affected by the birefringence, and is emitted from the back surface of the birefringent plate 15. Since the p-polarized light oscillates in a direction orthogonal to the oscillating direction of the s-polarized light, the p-polarized light is affected by the birefringence, and obliquely travels in the birefringent plate 15 in a direction opposite to the separation direction of an image in the birefringent plate 11. Further, the p-polarized light is refracted at a position shifted by the separation width d2 of the back surface of the birefringent plate 15, and is emitted from the back surface of the birefringent plate 15. Therefore, the birefringent plate 15 separates the s-polarized light and the p-polarized light that have passed through the liquid crystal layer 13 into s-polarized transmitted light L2 and p-polarized transmitted light L2 with a separation width (|d1|d2|). Here, in the case of d1=d2, the s-polarized transmitted light L2 and the p-polarized transmitted light L2 are emitted from the same position of the back surface of the birefringent plate 15. Accordingly, in this case, the birefringent plate 15 combines the s-polarized light and the p-polarized light that have passed through the liquid crystal layer 13 to generate combined light.

(In case of V=V3 and F=F3 (FIG. 4C))

A function of the birefringent plate 11 to the incident light L1 is the same as described above. Therefore, the function of the liquid crystal layer 13 and the birefringent plate 15 is described below. When the p-polarized light separated by the birefringent plate 11 enters the liquid crystal layer 13 whose polarization conversion efficiency is T3 (=50%), the p-polarized light is converted into circular-polarized light, as well as straightly travels in the liquid crystal layer 13, and is emitted from the back surface of the liquid crystal layer 13. When the s-polarized light separated by the birefringent plate 11 enters the liquid crystal layer 13 whose polarization conversion efficiency is T3 (=50%), the s-polarized light is also converted into circular-polarized light, as well as straightly travels in the liquid crystal layer 13, and is emitted from the back surface of the liquid crystal layer 13. Accordingly, the liquid crystal layer 13 converts the p-polarized light and the s-polarized light that have been separated by the birefringent plate 11, into the circular-polarized light with maintaining constant separation width.

When the circular-polarized light emitted from the liquid crystal layer 13 enters, the birefringent plate 15, the circular-polarized light is separated into p-polarized light and s-polarized light with the separation width d2 by the birefringence of the birefringent plate 15. When a polarization component oscillating perpendicular to the optical axis AX2 of the birefringent plate 15 is the s-polarized light, the s-polarized light straightly travels in the birefringent plate 15 without being affected by the birefringence, and is then emitted from the back surface of the birefringent plate 15. Since the p-polarized light oscillates in a direction orthogonal to the oscillating direction of the s-polarized light, the p-polarized light is affected by the birefringence and obliquely travels in the birefringent plate 15 in a direction opposite to the separation direction of an image in the birefringent plate 11. Further, the p-polarized light is refracted at a position shifted by the separation width d2 of the back surface of the birefringent plate 15, and is emitted from the back surface of the birefringent plate 15. Accordingly, the birefringent plate 15 separates each of the circular-polarized light that has been converted from the p-polarized light by the liquid crystal layer 13 and the circular-polarized light that has been converted from the s-polarized light by the liquid crystal layer 13 into s-polarized transmitted light L2 and p-polarized transmitted light L2 with the separation width d2.

Here, in the case of d1=d2, the p-polarized light that has been separated from the circular-polarized light converted from the p-polarized light by the liquid crystal layer 13 and the s-polarized light that has been separated from the circular-polarized light converted from the s-polarized light by the liquid crystal layer 13 are emitted from the same position of the back surface of the birefringent plate 15. In this case, the circular-polarized transmitted light L2 is emitted from the back surface of the birefringent plate 15. Therefore, in this case, the birefringent plate 15 separates the two beams of the circular-polarized light emitted from the liquid crystal layer 13 into the p-polarized transmitted light L2 and the s-polarized transmitted light L2 with the separation width (d2=d2), as well as combines the once-separated p-polarized light and the once-separated s-polarized light at a position between the p-polarized transmitted light L2 and the s-polarized transmitted light L2 to generate combined light.

Next, point image intensity distribution of transmitted light of the optical low pass filter 10 is described. FIG. 5A illustrates an example of point image intensify distribution of transmitted light in FIG. 4B, together with spread of a point image on a picture. FIG. 5B illustrates an example of point image intensity distribution of transmitted light in FIG. 4A. FIG. 5C illustrates an example of point image intensity distribution of transmitted light in FIG. 4C. FIG. 5D illustrates an example of point image intensity distribution of transmitted light when d1≠d2 is established in FIG. 4C.

When the voltage V2 or a voltage of the frequency F2 is applied between the electrodes 12 and 14, for example, as illustrated in FIG. 5A, the optical low pass filter 10 generates on peak p1 in the point image intensity distribution of the transmitted light of the optical low pass filter 10. For example, as illustrated in FIG. 4B, the peak p1 may be formed by one transmitted light L2 emitted from the birefringent plate 15. When the voltage V1 or the voltage of the frequency F1 is applied between the electrodes 12 and 14, for example, as illustrated in FIG. 5B, the optical low pass filter 10 generates two peaks p2 and p3 in the point image intensity distribution of the transmitted light of the optical low pass filter 10. For example, as illustrated in FIG. 4A, the two peaks p2 and p3 may be formed by two beams of the transmitted light L2 emitted from the birefringent plate 15.

When the voltage V3 or a voltage of the frequency F3 is applied between the electrodes 12 and 14 and d1=d2 is established, for example, as illustrated in FIG. 5C, the optical low pass filter 10 generates three peaks p1, p2, and p3 in the point image intensity distribution of the transmitted light of the optical low pass filter 10. For example, as illustrated in FIG. 4C, the three peaks p1, p2, and p3 may be formed by three transmitted light L2 emitted from the birefringent plate 15. When the voltage V3 or the voltage of the frequency F3 is applied between the electrodes 12 and 14 and d1≠d2 is established, for example, as illustrated in FIG. 5D, the optical low pass filter 10 generates four peaks p1, p2, p3, and p4 in the point image intensity distribution of the transmitted light of the optical low pass filter 10. For example, although not illustrated, the four peaks p1, p2, p3, and p4 may be formed of four transmitted light L2 emitted from the birefringent plate 15.

As described above, when the voltage V3 or the voltage of the frequency F3 is applied between the electrodes 12 and 14, the optical low pass filter 10 generates the three peaks p1 to p3 or the four peaks p1 to p4 in the point image intensity distribution of the transmitted light of the optical low pass filter 10. Here, when the magnitude of the voltage V3 or the frequency F3 to be applied between the electrodes 12 and 14 is changed, the values of the above-described three peaks p1 to p3 or the values of the above-described four peaks p1 to p4 are varied in the optical low pass filter 10. In other words, in the optical low pass filter 10, when the magnitude of the voltage V3 or the frequency F3 to be applied between the electrodes 12 and 14 is changed, the point image intensity distribution of the transmitted light is changed.

In this way, the optical low pass filter 10 changes the magnitude of the voltage V or the frequency F to be applied between the electrodes 12 and 14 to change the point image intensity distribution of the transmitted light. At this time, the peak values (peak heights) of the above-described three peaks p1 to p3 and the peak values (peak heights) of the above-described four peaks p1 to p4 are varied according to the magnitude of the voltage V or the frequency F to be applied between the electrodes 12 and 14. On the other hand, the peak positions of the above-described three peaks p1 to p3 and the peak positions of the above-described four peaks p1 to p4 are determined by the separation widths d1 and d2. The separation widths d1 and d2 are fixed irrespective of the magnitude of the voltage V3 or the frequency F3 to be applied between the electrodes 12 and 14. Therefore, the peak positions of the above-described three peaks p1 to p3 and the peak positions of the above-described four peaks p1 to p4 are fixed irrespective of the magnitude of the voltage V3 or the frequency F3 to be applied between the electrodes 12 and 14.

Next, relationship between the point image intensity distribution of the transmitted light and the cutoff frequency fc is described. FIG. 6 illustrates an example of MTF of each of FIG. 5A to FIG. 5D. The lateral axis indicates a spatial frequency, and the vertical axis indicates standardized contrast. In FIG. 5A, since the optical low pass filter 10 has no light beam separation effect, the MTF in FIG. 5A is coincident with MTF of a lens (for example, a lens 30 in FIG. 11 or the like) provided in a preceding stage of the optical low pass filter 10. In FIG. 5B, a distance between peaks is larger than a distance between peaks in FIG. 5C and FIG. 5D, and a light beam separation effect is a maximum. Therefore, a cutoff frequency fc1 of MTF in FIG. 5B is smaller than a cutoff frequency fc2 of MTF in FIG. 5C and FIG. 5D.

In FIG. 5C and FIG. 5D, although the separation width is equal to the separation width in FIG. 5B, the number of peaks is larger than that in FIG. 5B, and the distance between peaks is smaller than that in FIG. 5B. Therefore, in FIG. 5C and FIG. 5D, the light beam separation effect is weaker than that in FIG. 5B, and thus the cutoff frequency fc2 of the MTF in FIG. 5C and FIG. 5D is larger than the cutoff frequency fc1 of the MTF in FIG. 5B.

The cutoff frequency fc2 of the MTF in FIG. 5C and FIG. 5D is changed depending on the magnitude of the voltage V3 or the frequency F3 to be applied between the electrodes 12 and 14, and may be an arbitrary frequency larger than the cutoff frequency fc1 of the MTF in FIG. 5B. Therefore, the optical low pass filter 10 changes the magnitude of the voltage V or the frequency F to be applied between the electrodes 12 and 14 to set the cutoff frequency fc to an arbitrary value equal to or larger than a cutoff frequency at which the light beam separation effect is maximum.

(Effects)

Next, effects of the optical low pass filter 10 will be described.

In the optical low pass filter 10, when the voltage V3 or the voltage of the frequency F3 is applied between the electrodes 12 and 14, the pair of birefringent plates 11 and 15 and the liquid crystal layer 13 generate the three peaks p1 to p3 or the four peaks p1 to p4 in the point image intensity distribution of the transmitted light. When the magnitude of the voltage V3 or the frequency F3 to be applied between the electrodes 12 and 14 is changed, the polarization conversion efficiency of the liquid crystal layer 13 is changed. Therefore, the peak values of the point image intensity distribution are also varied. When the peak, values of the point image intensity distribution are varied, the cutoff frequency fc of the optical low pass filter 10 is also changed. In this way, in the optical low pass filter 10, the cutoff frequency fc is changed by a method (a peak value modulation method) different from an existing method (a separation width modulation method) in which the ps separation width of the transmitted light is changed.

Moreover, in the optical low pass filter 10, the values of the three peaks p1 to p3 or the four peaks p1 to p4 generated in the point image intensity distribution of the transmitted light are varied according to the magnitude of the voltage V3 or the frequency F3 to be applied between the electrodes 12 and 14, which makes it possible to change the cutoff frequency fc of the optical low pass filter 10. Therefore, only changing the magnitude of the voltage V3 or the frequency F3 to be applied between the electrodes 12 and 14 makes it possible to set a cutoff frequency different from the cutoff frequency initially set. Accordingly, the optical low pass filter 10 has a structure capable of changing the cutoff frequency fc without preparing new optical component.

2. Modification of First Embodiment

Next, various modifications of the optical low pass filter 10 according to the above-described first embodiment will be described.

2.1 First Modification

FIG. 7 illustrates a modification of the optical axes AX1 and AX2 of the respective birefringent plates 11 and 15. In a first modification, the separation directions of image in the birefringent plates 11 and 15 are directed in the same direction. The optical axis AX1 of the birefringent plate 11 and the optical axis AX2 of the birefringent plate 15 are parallel to each other in a plane parallel to the normal 11A of the light incident surface 10A. The optical axes AX1 and AX2 obliquely intersect with the normal 11A of the light incident surface 10A. The angle θ2 formed by the optical axis AX1 and the normal 11A may be, for example, smaller than 90 degrees in a counterclockwise direction with the normal 11A as a reference, and for example, may be about 45 degrees. The angle θ3 formed by the optical axis AX2 and the normal 11A may be, for example, smaller than 90 degrees in a counterclockwise direction with the normal 11A as a reference, and for example, may be about 45 degrees.

Next, an optical function of the optical low pass filter 10 (specifically, the pair of birefringent plates 11 and 15 and the liquid crystal layer 13) according to the first modification is described. FIG. 8A, FIG. 8B, and FIG. 8C each illustrate an example of the function of the optical low pass filter 10 according to the first modification. In FIG. 8A, the voltage V between the electrodes 12 and 14 is the voltage V1, or the frequency F between the electrodes 12 and 14 is the frequency F1. In FIG. 8B, the voltage V between the electrodes 12 and 14 is the voltage V2, or the frequency F between the electrodes 12 and 14 is the frequency F2. In FIG. 8C, the voltage V between the electrodes 12 and 14 is the voltage V3, or the frequency F between the electrodes 12 and 14 is the frequency F3.

(In case of V1=V1 and F=F1 (FIG. 8A))

The function of the birefringent plate 11 to the incident light L1 and the function to the p-polarized light and the s-polarized light that are separated by the birefringent plate 11 are the same as those described in the above-described first embodiment. Therefore, the function of the birefringent plate 15 is described below. When the s-polarized light and the p-polarized light that have passed through the liquid crystal layer 13 enter the birefringent plate 15, the separation width of the s-polarized light and the p-polarized light is changed by the birefringence of the birefringent plate 15. When a polarization component oscillating perpendicular to the optical axis AX2 of the birefringent plate 15 is the s-polarized light, the s-polarized light straightly travels in the birefringent plate 15 without being affected by the birefringence, and is emitted from the back surface of the birefringent plate 15. Since the p-polarized light oscillates in a direction orthogonal to the oscillating direction of the s-polarized light, the p-polarized light is affected by the birefringence and obliquely travels in the birefringent plate 15 in the same direction as the separation direction of the image in the birefringent plate 11. Further, the p-polarized light is retracted at a position shifted by the separation width d2 of the back surface of the birefringent plate 15, and is emitted from the back surface of the birefringent plate 15. Therefore, the birefringent plate 15 separates the s-polarized light and the p-polarized right that have passed through the liquid crystal layer 13, into the s-polarized transmitted light L2 and the p-polarized transmitted light L2 with the separation width (d1−d2). At this time, in the case of d1=d2, the s-polarized transmitted light L2 and the p-polarized transmitted light L2 are emitted from the same position of the back surface of the birefringent plate 15. Accordingly, in this case, the birefringent plate 15 combines the s-polarized light and the p-polarized light that have passed through the liquid crystal layer 13 to generate combined light.

(In case of V=V2 and F=F2 (FIG. 8B))

The function of the birefringent plate 11 to the incident light L1 and the function to the p-polarized light and the s-polarized light that are separated by the birefringent plate 11 are the same as those described in the above-described first embodiment. Therefore, the function of the birefringent plate 15 is described below. When the s-polarized light and the p-polarized light that have passed through the liquid crystal layer 13 enter the birefringent plate 15, the separation width of the s-polarized light and the p-polarized light is changed by the birefringence of the birefringent plate 15. When a polarization component oscillating perpendicular to the optical axis AX2 of the birefringent plate 15 is the s-polarized light, the s-polarized light straightly travels in the birefringent plate 15 without being affected by the birefringence, and is emitted from the back surface of the birefringent plate 15. Since the p-polarized light oscillates in a direction orthogonal to the oscillating direction of the s-polarized light, the p-polarized light is affected by the birefringence, and obliquely travels in the birefringent plate 15 in the same direction as the separation direction of the image in the birefringent plate 11. Further, the p-polarized light is refracted at a position shifted by the separation width d2 of the back surface of the birefringent plate 15, and is emitted from the back surface of the birefringent plate 15. Therefore, the birefringent plate 15 separates the s-polarized light and the p-polarized light that have passed through the liquid crystal layer 13, into the s-polarized transmitted light L2 and the p-polarized transmitted light L2 with the separation width (d1+d2).

(In case of V=V3 and F=F3 (FIG. 8C))

The function of the birefringent plate 11 to the incident light L1 and the function to the p-polarized light and the s-polarized light that are separated by the birefringent plate 11 are the same as those described in the above-described first embodiment. Therefore, the function of the birefringent plate 15 is described below. When the circular-polarized light emitted from the liquid crystal layer 13 enter the birefringent plate 15, the circular-polarized light is separated info the p-polarized light and the s-polarized light with the separation width d2 by the birefringence of the birefringent plate 15. When a polarization component oscillating perpendicular to the optical axis AX2 of the birefringent plate 15 is the s-polarized light, the s-polarized light straightly travels in the birefringent plate 15 without being affected by the birefringence, and is emitted from the back surface of the birefringent plate 15. Since the p-polarized light oscillates in a direction orthogonal to the oscillating direction of the s-polarized light, the p-polarized light is affected by the birefringence, and obliquely travels in the birefringent plate 15 in the same direction as the separation direction of the image in the birefringent plate 11. Further, the p-polarized light is refracted at a position shifted by the separation width d2 of the back surface of the birefringent plate 15, and is emitted from the back surface of the birefringent plate 15. Accordingly, the birefringent plate 15 separates each of the circular-polarized light converted from the p-polarized light by the liquid crystal layer 13 and the circular-polarized light converted from the s-polarized light by the liquid crystal layer 13, into the s-polarized transmitted light L2 and the p-polarized transmitted light L2 with the separation width d2.

At this time, in the case of d1=d2, the p-polarized light that is separated from the circular-polarized light converted from the p-polarized light by the liquid crystal layer 13 and the s-polarized light that is separated from the circular-polarized light converted from the s-polarized light by the liquid crystal layer 13 are emitted from the same position of the back surface of the birefringent plate 15. In this case, the circular-polarized transmitted light L2 is emitted from the back surface of the birefringent plate 15. Therefore, in this case, the birefringent plate 15 separates two beams of the circular-polarized light emitted from the liquid crystal layer 13 into p-polarized transmitted light L2 and s-polarized transmitted light L2 with the separation width (d2+d2), and combines the once-separated p-polarized light and the once-separated s-polarized light at a position between the p-polarized transmitted light L2 and the s-polarized transmitted light L2 to generate the combined light.

(Effects)

Also in the first modification, the cutoff frequency fc is changed by a method (the peak value modulation method) that is different from an existing method (the separation width modulation method) in which the ps separation width of the transmitted light is changed. Further, also in the first modification, the values of the three peaks p1 to p3 or the four peaks p1 to p4 that are generated in the point image intensity distribution of the transmitted light are changed according to the magnitude of the voltage V3 or the frequency F3 applied between the electrodes 12 and 14, which makes it possible to change the cutoff frequency fc. Therefore, only changing the magnitude of the voltage V3 or the frequency F3 to be applied between the electrodes 12 and 14 makes it possible to set a cutoff frequency different from the cutoff frequency initially set. Accordingly, the optical low pass filter 10 according to the first modification has a structure capable of changing the cutoff frequency fc without preparing new optical component.

2.2 Second Modification

FIG. 9A illustrates a modification of the polarization conversion efficiency curve (V-T curve) of the liquid crystal layer 13. FIG. 9B illustrates a modification of the polarization conversion efficiency curve (F-T curve) of the liquid crystal layer 13. In FIG. 9A, the lateral axis indicates the voltage V (constant frequency) applied between the electrodes 12 and 14. In FIG. 9B, the lateral axis indicates the frequency of the voltage (constant voltage) applied between the electrodes 12 and 14. In FIG. 9A and FIG. 9B, the vertical axis indicates the polarization conversion efficiency T.

As illustrated in FIG. 9A, in the liquid crystal layer 13 according to a second modification, when the voltage V1 is applied between the electrodes 12 and 14, the polarization conversion efficiency T becomes T1, and when the voltage V2 (V1<V2) is applied between the electrodes 12 and 14, the polarization conversion efficiency T becomes T2. T2 indicates 100%, and T1 indicates 0%. Further, as illustrated in FIG. 9A, in the liquid crystal layer 13, when the voltage V3 (V1<V3<V2) is applied between the electrodes 12 and 14, the polarization conversion efficiency T becomes T3. T3 is a value larger than 0% and smaller than 100%. In FIG. 9A, a case where the voltage V3 is a voltage at which the T3 becomes 50% is exemplified. In this case, the voltage V1 is a voltage smaller than a voltage at the rising position of the polarization conversion efficiency curve. The voltage V2 is a voltage larger than a voltage at the falling position of the polarization conversion efficiency curve. The voltage V3 is a voltage that is larger than the voltage at the rising position of the polarization conversion efficiency curve, and is smaller than the voltage at the falling position of the polarization conversion efficiency curve. The voltage V3 is a voltage between a voltage at the rising position and a voltage at the falling position of the polarization conversion efficiency curve (in other words, is an intermediate voltage).

As illustrated in FIG. 9B, in the liquid crystal layer 13, when the voltage of the frequency F1 is applied between the electrodes 12 and 14, the polarization conversion efficiency T becomes T1, and when the voltage of the frequency F2 (F1<F2) is applied between the electrodes 12 and 14, the polarization conversion efficiency T becomes T2. Further, as illustrated in FIG. 9B, in the liquid crystal layer 13, when the voltage of the frequency F3 (F1<F3<F2) is applied between the electrodes 12 and 14, the polarization conversion efficiency T becomes T3. In FIG. 9B, a case where the frequency F3 is a frequency at which T3 becomes 50% is exemplified. Here, the frequency F1 is a frequency smaller than a frequency at the rising position of the polarization conversion efficiency curve. The frequency F2 is a frequency larger than a frequency at the falling position of the polarization conversion efficiency curve. The frequency F3 is a frequency that is larger than the frequency at the rising position of the polarization conversion efficiency curve and is smaller than the frequency at the falling position of the polarization conversion efficiency curve. The frequency F3 is a frequency between a frequency at the rising position and a frequency at the falling position of the polarization conversion efficiency curve (in other words, is the intermediate frequency).

As described above, the liquid crystal layer 13 controls polarization. Examples of the liquid crystal having the above-described polarization conversion efficiency curve may include vertical alignment (VA) liquid crystal. The VA liquid crystal is configured of negative nematic liquid crystal. The phase of passing light is changed by utilizing birefringence of the nematic liquid crystal, which makes it possible to change the polarization direction of the passing light.

(Effects)

Also in the second modification, the cutoff frequency fc is changed by a method (the peak value modulation method) that is different from an existing method (the separation width modulation method) in which the ps separation width of the transmitted light is changed. Further, also in the second modification, the values of the three peaks p1 to p3 or the four peaks p1 to p4 that are generated in the point image intensity distribution of the transmitted light are varied according to the magnitude of the voltage V3 or the frequency F3 to be applied between the electrodes 12 and 14, which makes it possible to change the cutoff frequency fc. Therefore, only changing the magnitude of the voltage V3 or the frequency F3 to be applied between the electrodes 12 and 14 makes it possible to set the cutoff frequency different from the cutoff frequency initially set. Accordingly, the optical low pass filter 10 according to the second modification has a structure capable of changing the cutoff frequency fc without preparing new optical component. Note that the second modification is applicable to the optical low pass filter 10 according to the first modification, in addition to the optical low pass filter 10 according to the above-described first embodiment.

2.3 Third Modification

FIG. 10 illustrates a modification of the schematic structure of the optical low pass filter 10 according to the first embodiment, the first modification, and the second modification. For example, the optical low pass filter 10 according to a third modification may include an antireflection (AR) layer 16 on the light incident side of the birefringent plate 11. At this time, an outside surface of the AR layer 16 is the light incident surface 10A. The AR layer 16 reduces reflection on the light incident surface 10A and improves transmittance. For example, the optical low pass filter 10 according to the third modification may include a low reflection layer 17 between the birefringent plate 11 and the electrode 12. The low reflection layer 17 reduces reflection on an interface. Providing the AR layer 16 and the low reflection layer 17 makes it possible to improve light taking rate of an image pickup element provided in a subsequent stage of the optical low pass filter 10.

For example, the optical low pass filter 10 according to the third modification may include an IR cut layer in place of the AR layer 16. The IR cut layer reflects infrared rays and allows visible light to pass therethrough. Providing the IR cut layer makes it possible to remove infrared rays highly sensitive in the image pickup element provided in the subsequent stage of the optical low pass filter 10.

3. Second Embodiment (Configuration)

FIG. 11 illustrates a schematic configuration of an image pickup device 1 according to a second embodiment of the technology. The image pickup device 1 includes the optical low pass filter 10 according to the first embodiment, the first modification, the second modification, or the fluid modification. For example, the image pickup device 1 may include the optical low pass filter 10, the drive circuit 20, the lens 30, an iris 40, a drive circuit 50, and an image pickup element 60. The lens 30 and the iris 40 are disposed in the preceding stage of the optical low pass filter 10, and the image pickup element 60 is provided in the subsequent stage of the optical low pass filter 10.

The lens 30 collects object light, and allows collected object light to enter a light incident surface of the image pickup element 60. The iris 40 adjusts an incident amount of the object light to the light incident surface of the image pickup element 60. The drive circuit 50 mechanically drives the lens 30 and the iris 40. For example, the drive circuit 50 may move the position of the lens 30 on the optical axis forward and backward to adjust a focal point. Further, for example, the drive circuit 50 may adjust a stop-down amount of the iris 40 to adjust the incident amount of the object light to the light incident surface of the image pickup element 60.

For example, the image pickup element 60 may have a light receiving section and a color filter array. The light receiving section may include a plurality of photoelectric conversion elements two-dimensionally arranged with a predetermined distance. The color filter array may the disposed on a light incident surface of the light receiving section. For example, the image pickup element 60 may discretely sample the object light that has entered the image pickup element 60 through the lens 30, the iris 40, and the optical low pass filter 10 by the light receiving section and the color filter array to obtain color image data.

The drive circuit 20 drives the optical low pass filter 10 and the image pickup element 60. The drive circuit 20 applies the voltage V (constant frequency) or the voltage of the frequency F (constant voltage) between the electrodes 12 and 14 of the optical low pass filter 10 to adjust the cutoff frequency fc of the optical low pass filter 10. Specifically, the drive circuit 20 applies the voltage V3 (constant frequency) or the voltage of the frequency F3 (constant voltage) between the electrodes 12 and 14 of the optical low pass filter 10 to adjust the cutoff frequency fc of the optical low pass filter 10. The drive circuit 20 drives the image pickup element 60 to acquire the image data by the image pickup element 60, and to output the image data to the outside.

(Effects)

In the image pickup device 1 according to the second embodiment, the voltage V3 between a voltage at the rising position and a voltage at the falling position of the polarization conversion efficiency curve of the liquid crystal layer 13 or the intermediate frequency F3 between a frequency at the rising position and a frequency at the falling position is applied between the electrodes 12 and 14 by the drive circuit 20. When the magnitude of the voltage V3 or the intermediate frequency F3 to be applied between the electrodes 12 and 14 is changed, the polarization conversion efficiency of the liquid crystal layer 13 is changed. Therefore, three or four peaks are generated in the point image intensity distribution of the transmitted light L2 of the optical low pass filter 10 as well as values of the peaks are varied. When the values of the peaks in the point image intensity distribution are varied, the cutoff frequency fc of the optical low pass filter 10 is also changed. In this way, in the image pickup device 1 according to the second embodiment, the cutoff frequency fc is changed by a method (the peak value modulation method) different from an existing method (the separation width modulation method) in which the ps separation width of the transmitted light L2 is changed.

Moreover, in the image pickup device 1 according to the second embodiment, the values of the three or four peaks generated in the point image intensity distribution of the transmitted light L2 are varied according to the magnitude of the voltage V3 or the intermediate frequency F3 to be applied between the electrodes 12 and 14, which makes it possible to change the cutoff frequency fc of the optical low pass filter 10. Therefore, only changing the magnitude of the voltage V3 or the intermediate frequency F3 to be applied between the electrodes 12 and 14 makes it possible to set the cutoff frequency different from the cutoff frequency initially set. Accordingly, the optical low pass filter 10 has a structure capable of changing the cutoff frequency fc without preparing new optical component.

4. Modification of Second Embodiment

FIG. 12 illustrates a modification of the schematic configuration of the image pickup device 1. In the present modification, the image pickup device 1 further includes one optical low pass filter 10 and a phase canceling plate 70. In the present modification, two optical low pass filters 10 are disposed in the preceding stage of the image pickup element 60, and the phase canceling plate 70 is provided between the two optical low pass filters 10. The drive circuit 20 drives the two optical low pass filters 10. The phase canceling plate 70 converts the transmitted light L2 of the preceding optical low pass filter 10 into circular-polarized light.

For example, the preceding optical low pass filter 10 may be disposed so as to perform image separation in a perpendicular direction. For example, the subsequent optical low pass filter 10 may be disposed so as to perform image separation in a horizontal direction. The image separation in the perpendicular direction and in the horizontal direction is performed by the two optical low pass filters 10 and the phase canceling plate 70.

Also in the image pickup device 1 according to the present modification, as with the above-described second embodiment, the cutoff frequency fc is changed by a method (the peak value modulation method) different from an existing method (the separation width modulation method) in which the ps separation width of the transmitted light L2 is changed. Moreover, the values of the three or four peaks that are generated in the point image intensity distribution of the transmitted light L2 are varied according to the magnitude of the voltage V3 or the frequency F3 to be applied between the electrodes 12 and 14, which makes it possible to change the cutoff frequency fc of each of the optical low pass filters 10. Therefore, only changing the magnitude of the voltage V3 or the frequency F3 to be applied between the electrodes 12 and 14 makes it possible to set the cutoff frequency different from the cutoff frequency initially set. Accordingly, each of the optical low pass filters 10 has a structure capable of changing the cutoff frequency fc without preparing new optical component.

In the present modification, for example, as illustrated in FIG. 13, a birefringent plate 80 may be disposed in place of the phase canceling plate 70. The birefringent plate 80 has birefringence and a uniaxial crystal structure. For example, the birefringent plate 80 may be formed of liquid crystal, calcite, or lithium niobate. The birefringent plate 80 separates an image in a direction inclined by about 45 degrees from the separation direction of the image in the birefringent plates 11 and 15. Even when the birefringent plate 80 is disposed in place of the phase canceling plate 70, the image separation in the perpendicular direction and in the horizontal direction is allowed to be performed by the two optical low pass filters 10 and the birefringent plate 80.

5. Third Embodiment

FIG. 14 illustrates an example of a schematic configuration of an image pickup apparatus 100 according to a third embodiment of the technology. For example, the image pickup apparatus 100 may include the image pickup device 1 according to the above-described second embodiment or the modification thereof, an operation section 2, a display section 3, a memory section 4, and an input section 5. The operation section 2 performs predetermined processing on image data Drow output from the image pickup device 1. For example, the operation section 2 may include a preprocessing circuit 21, a control circuit 22, a display processing circuit 23, a compression expansion circuit 24, and a memory control circuit 25.

The preprocessing circuit 21 performs optical correction processing such as shading correction on the image data Drow output from the image pickup device 1. For example, the control circuit 22 may be a microcomputer configured including a central processing unit (CPU), a read only memory (ROM), a random access memory (RAM), and the like. For example, the control circuit 22 may execute program stored in the ROM and the like to perform various processing (described later) on corrected image data D output from the preprocessing circuit 21. For example, the control circuit 22 may output image data during exposure to the display processing circuit 23. For example, the control circuit 22 may output the image data that is during exposure and is to be picked up, to the compression expansion circuit 24.

The display processing circuit 23 generates an image signal to be displayed on the display section 3 from the image data received from the control circuit 22, to transmit the image signal to the display section 3. The compression, expansion circuit 24 may perform compression coding processing on the image data of a still image received from the control circuit 22 by a coding method of the still image such as join photographic experts group (JPEG). Moreover, the compression expansion circuit 24 may perform compression coding processing on the image data of a moving picture received from the control circuit 22 by a coding method of the moving picture such as moving picture experts group (MPEG). The memory control circuit 25 controls writing and reading of the image data with respect to the memory section 4.

For example, the display section 3 may be formed of a liquid crystal display (LCD), and may display the image data during, exposure, the image data read from the memory section 4, and the like. The memory section 4 holds the image data received from the memory control circuit 25. The input section 5 receives instruction from a user, and may be configured of, for example, operation buttons, a keyboard, and the like.

Next, various functions of the image pickup apparatus 100 will be described.

FIG. 15 to FIG. 18 illustrate an example of an image pickup procedure in the operation section 2, and specifically illustrates an example of a procedure of performing multistage exposure while variably controlling a blurring quantity of the image. An example of a procedure of performing the multistage exposure while variably controlling the cutoff frequency fc that is one of parameters specifying the blurring quantity of the image will be described below. Note that image data. D1, D2, and D3 described in drawings and the following paragraphs correspond to three pieces of image data D whose blurring quantities of the image are different from one another.

(Multistage Exposure 1 (FIG. 15))

First, the operation section 2 acquires the image data D1 on a condition A1 (step S101). The condition A is a condition of the voltage V3 or the frequency F3 to be applied to the optical low pass filter 10, and for example, may be Va or Fa. Specifically, the control circuit 22 instructs the image pickup device 1 to apply the voltage Va or a voltage of the frequency Fa to the optical low pass fitter 10, and the preprocessing circuit 21 acquires the image data Drow that is obtained by performing exposure on the condition A1, from the image pickup element 60. The control circuit 22 acquires the image data D1 that is generated by processing the image data Drow in the preprocessing circuit 21, from the preprocessing circuit 21.

Next, the operation section 2 allows the display section 3 to display the image data D1 obtained on the condition A1 (step S102). Specifically, the control circuit 22 outputs the image data D1 to the display processing circuit 23, and the display processing circuit 23 generates an image signal necessary for displaying the image data D1 and outputs the generated image signal to the display section 3. The display section 3 displays the image data D1 based on the image signal.

Next, the operation section 2 requests a user to make an answer whether the user selects the image data D1 obtained on the condition A1 (in other words, the image data D1 is stored) (step S103). Specifically, the control circuit 22 generates the image data relating to the above-described request, outputs the generated image data to the display processing circuit 23, and allows the display section 3 to display the image data relating to the above-described request. When the user selects select the image data D1 with use of the input section 5, the operation section 2 stores the image data D1 in the memory section 4 (step S104).

Next, the operation section 2 acquires the image data D2 on a condition A2 (step S105). The condition A2 is a condition of the voltage V3 or the frequency F3 to be applied to the optical low pass filter 10, and is a condition different from the condition A1, for example, Vb or Fb. Specifically, the control circuit 22 instructs the image pickup device 1 to apply the voltage Vb or a voltage of the frequency Fb to the optical low pass filter 10, and the preprocessing circuit 21 acquires the image data Drow that is obtained by performing exposure on the condition A2, from the image pickup element 60. The control circuit 22 acquires the image data D2 that is generated by processing the image data Drow in the preprocessing circuit 21, from the preprocessing circuit 21.

After that, the operation section 2 requests the user to make an answer in the same way as described above, and when the user selects the image data D2 with use of the input section 5, the operation section 2 stores the image data D2 in the memory section 4 (steps S106 to S108).

Next, the operation section 2 performs the same procedure as described above on a condition A3 (steps S109 to S112). The condition A3 is a condition of the voltage V3 or the frequency F3 applied to the optical low pass filter 10, and is a condition different from the conditions A1 and A2, for example, Vc or Fc. Then, the operation section 2 requests the user to make an answer whether the multistage exposure is ended or continued (step S113). When the user selects end with use of the input section 5, the operation section 2 ends the multistage exposure, and when the user selects continuation with use of the input section 5, the operation section 2 continues the multistage exposure. Note that the voltage V1 or the frequency F1, or the voltage V2 or the frequency F2 may be set in any of the above-described conditions A1, A2, and A3.

In this way, in the image-pickup apparatus 100, only changing the condition of the voltage V3 or the frequency F3 to be applied to the optical low pass filter 10 makes it possible to perform the multistage exposure. Therefore, since it is unnecessary to operate every mechanical component for the multistage exposure, it is possible not only to perform the multistage exposure at high speed but also to achieve the multistage exposure with simple configuration.
(Multistage Exposure 2 (FIG. 16))

In the multistage exposure f, the operation section 2 allows the display section 3 to display the image data D for every time when acquiring the image data D. However, for example, as illustrated in FIG. 16, the operation section 2 acquires the image data D (D1 to D3) on all conditions (the conditions A, B, and C) as well as stores the image data D in the memory section 4 (steps S201 to S206). After that, for example, as illustrated in FIG. 16, the operation section 2 may allow the display section 3 to display all of the acquired image data D (D1 to D3) collectively or sequentially one by one (step S207).

As described above, in the image pickup apparatus 100, only changing the condition of the voltage V3 or the frequency F3 to be applied to the optical low pass filter 10 makes it possible to perform the multistage exposure. Therefore, since it is unnecessary to operate every mechanical component for the multistage exposure, it is possible not only to perform the multistage exposure at high speed but also to achieve the multistage exposure with simple configuration.
(Multistage Exposure 3 (FIG. 17 and FIG. 18))

In the multistage exposure 1 and 2, the operation section 2 selects the voltage V3 or the frequency F3 to be applied to the optical low pass filter 10 as the condition of changing exposure in a stepwise manner in the multistage exposure, and the conditions of the iris and the focus are fixed. However, for example as illustrated in FIG. 17, the operation section 2 may prepare conditions B1, B2 and B3 as a condition of the iris, and may perform a series of procedure S200 including the steps S201 to S206 on the respective conditions B1, B2, and B3 of the iris (steps S301 to S303). Likewise, for example as illustrated in FIG. 18, the operation section 2 may prepare conditions C1, C2 and C3 as the condition of the focus, and may perform the series of procedure S200 including the steps S201 to S206 on the respective conditions C1, C2, and C3 of the focus (steps S401 to S403).

As described above, in the image pickup apparatus 100, changing the condition of the iris and the focus in addition to the condition of the optical low pass filter 100 makes it possible to obtain blurring image with different touch.

FIG. 19 to FIG. 25 illustrate an example of the image pickup procedure in the operation section 2, and specifically illustrates an example of a procedure of reducing moiré (a false signal) due to the object light containing high spatial frequency. An example of a procedure of reducing moiré (the false signal) while variably controlling the cutoff frequency fc that is one of parameters specifying the blurring quantity of the image will be described below.
(Moire Reduction 1 (FIG. 19 and FIG. 20))

First, the operation section 2 acquires the image data D1 on the condition A1 (step S501). Specifically, the control circuit 22 instructs the image pickup device 1 to apply the voltage Va or the voltage of the frequency Fa to the optical low pass filter 10, and the preprocessing circuit 21 acquires the image data Drow that is obtained by performing exposure on the condition A1, from the image pickup element 60. The control circuit 22 acquires the image data D1 that is generated by processing the image data Drow in the preprocessing circuit 21, from the preprocessing circuit 21. Subsequently, the operation section 2 stores the image data D1 in the memory section 4 (step S502).

Next, the operation section 2 acquires the image data D2 on the condition A2 (step S503). Specifically, the control circuit 22 instructs the image pickup device 1 to apply the voltage Vb or the voltage of the frequency Fb to the optical low pass filter 10, and the preprocessing circuit 21 acquires the image data Drow that is obtained by performing exposure on the condition A2, from the image pickup element 60. The control circuit 22 acquires the image data D2 that is generated by processing the image data Drow in the preprocessing circuit 21, from the preprocessing circuit 21. Next, the operation section 2 stores the image data D2 in the memory section 4 (step S504).

Note that the operation section 2 may perform the steps S502 and S504 successively after performing the steps S501 and S503 successively. Moreover, the voltage V1 or the frequency F1, or the voltage V2 or the frequency F2 may be set in any of the above-described conditions A1 and A2.

Next, the operation section 2 uses difference between two pieces of image data D1 and D2 whose blurring quantities of the image are different from each other, to generate processed data D4 in which the false signal is reduced, and stores the processed data D4 in the memory section 4. Specifically, as illustrated in an upper part of FIG. 20, the control circuit 22 subtracts the image data D2 from the image data D1 to derive difference data ΔD1 (step S505). Next, as illustrated in a lower part of FIG. 20, the control circuit 22 subtracts the difference data ΔD1 from the image data D1 to derive the processed data D4 (step S506). Subsequently, the control circuit 22 stores the processed data D4 in the memory section 4 (step S507).

In this way, in the image pickup apparatus 100, only changing the condition of the voltage V3 or the frequency F3 to be applied to the optical low pass filter 10 makes it possible to obtain, two pieces of image data D1 and D2 whose blurring quantities of the image are different from each other. Therefore, since it is unnecessary to operate every mechanical component for the multistage exposure, it is possible not only to perform the moiré reduction processing at high speed but also to achieve the moiré reduction processing with simple configuration.

(Moire Reduction 2 (FIG. 21 and FIG. 22))

First, the operation section 2 performs the above-described steps S501 to S504. Note that the operation section 2 may perform the steps S502 and S504 successively after performing the steps S501 and S503 successively. Next, the operation section 2 adds the two pieces of image data D1 and D2 whose blurring quantities of the image are different from each other, to each other to generate processed data D5 in which the false signal is reduced, and stores the processed data D5 in the memory section 4. Specifically, as illustrated in FIG. 22, the control circuit 22 integrates the image data D1 with the image data D2 to derive the processed data D5 (step S508). After that, the control circuit 22 stores the processed data D5 in the memory section 4 (step S509).

In this way, in the image pickup apparatus 100, only changing the condition of the voltage V3 or the frequency F3 to be applied to the optical low pass filter 10 makes it possible to obtain the two pieces of image data D1 and D2 whose blurring quantities of the image are different from each other. Accordingly, since it is unnecessary to operate every mechanical component for the multistage exposure, it is possible not only to perform the moiré reduction processing at high speed but also to achieve the moiré reduction processing with simple configuration.

(Moire Reduction 3 (FIG. 23 to FIG. 25))

First, the operation section 2 performs the above-described steps S501 to S504. Note that the operation section 2 may perform the steps S502 and S504 successively after performing the steps S501 and S503 successively. Next, the operation section 2 combines the two pieces of image data D1 and D2 whose blurring quantities of the image are different from each other, to generate processed data D6 in which the blurring quantity of the image is partially different, and stores the processed data D6 in the memory section 4.

Specifically, as illustrated in a left column in FIG. 24, the control circuit 22 extracts a region A of the image data D1 (step S510). For example, the region A may be a region where moiré (the false signal) caused by the object light containing high spatial frequency occurs. For example, the region A may be selected by a user. Then, as illustrated in a center column in FIG. 24, the control circuit 22 extracts a region B of the image data D2 (step S511). For example, the region B may be a region where moiré (the false signal) caused by the object light containing high spatial frequency less occurs (or does not occur). For example, the region B may be selected by the user.

Next, the control circuit 22 derives the processed data D6 (step S512). For example, as illustrated in a lower part in FIG. 24, the control circuit 22 may integrate the region A of the image data D1 and the region B of the image data D2 to derive the processed data D6 in which the moiré is reduced tor is eliminated) in the region A. After that, the control circuit 22 stores the processed data D6 in the memory section 4 (step S513). Note that, for example, as illustrated in a lower part of FIG. 25, the control circuit 22 may replace the region A of the image data D1 with the region B of the image data D2 to derive the processed data D6.

In this way, in the image pickup apparatus 100, only changing the condition of the voltage V3 or the frequency F3 to be applied to the optical low pass filter 10 makes it possible to obtain the two pieces of image data D1 and D2 whose blurring quantities of the image are different from each other. Therefore, since it is unnecessary to operate every mechanical component for the multistage exposure, it is possible not only to perform the moiré reduction processing at high speed but also to achieve the moiré reduction processing with simple configuration.

Note that the procedure of the moiré reduction 3 is allowed to be used for the purpose other than the moiré reduction processing. For example, the procedure of the moiré reduction 3 may be used in the case where the region A is a region where an object to be captured is photographed and the region B surrounding the object to be captured is intentionally blurred.

FIG. 26 and FIG. 27 illustrate an example of the image pickup procedure in the operation section 2, and specifically illustrate an example of the procedure when capturing of a moving picture or a still image is selected. An example of a procedure of capturing the moving picture or the still image while variably controlling the cutoff frequency fc that is one of parameters specifying the blurring quantity of the image will be described below.

(Capturing of Moving Picture or Still Image (FIG. 26))

First, the operation section 2 requests a user to make an answer whether the user selects the still image or the moving picture (step S601). As a result, when the user selects the still image, the operation section 2 acquires image data D7 of the still image on a condition A4 (step S602). The condition A4 is a condition of the voltage V3 or the frequency F3 to be applied to the optical low pass filter 10, and may be, for example, Vd or Fd. Specifically, the control circuit 22 instructs the image pickup device 1 to apply the voltage Vd or a voltage of the frequency Fd to the optical low pass filter 10, and the preprocessing circuit 21 acquires the image data Drow that is obtained by performing exposure on the condition A4, from the image pickup element 60. The control circuit 22 acquires the image data D7 that is generated by processing the image data Drow in the preprocessing circuit 21, from, the preprocessing circuit 21. Next, the operation section 2 stores the image data D7 in the memory section 4 (step S603).

On the other hand, when the user selects the moving picture, the operation section 2 acquires image data D8 of the moving picture on a condition A5 (step S604). The condition A5 is a condition of the voltage V3 or the frequency F3 to be applied to the optical low pass filter 10, and is different front the condition A4, for example, Ve or Fe. In other words, the operation section 2 changes the magnitude of the voltage V3 or the frequency F3 depending on a still image mode or a moving picture mode. The control circuit 22 instructs the image pickup device 1 to apply the voltage Ve or a voltage of the frequency Fe to the optical low pass filter 10, and the preprocessing circuit 21 acquires the image data Drow of the moving picture that is obtained by performing exposure on the condition A5, from the image pickup element 60. The control circuit 22 acquires the image data D8 of the moving picture that is generated by processing the image data Drow in the preprocessing circuit 21, from the preprocessing circuit 21. Next, the operation section 2 stores the image data D8 of the moving picture in the memory section 4 (step S605). Note that the voltage V1 or the frequency F1, or the voltage V2 or the frequency F2 may be set in any of the above-described conditions A4 and A5.

In this way, in the image pickup apparatus 100, only changing the condition of the voltage V3 or the frequency F3 to be applied to the optical low pass filter 10 make it possible to set the condition suitable for the still image or the condition suitable for the moving picture. Therefore, since it is unnecessary to operate every mechanical component for selective exposure of the still image and the moving picture, it is possible not only to switch between the still image and the moving picture at high speed but also to perform exposure and capturing with simple configuration on the condition suitable for the still image or the condition suitable for the moving picture.

Next, a procedure focusing on an advantage that the still image and the moving picture are switched at high speed will be described.

(Capturing of Moving Picture or Still Image (FIG. 27))

First, the operation section 2 requests the user to make an answer whether the user selects the still image or the moving picture (step S601). As a result, when the user selects the still image, the operation section 2 performs the same procedure as described above (steps S602 and S603).

On the other hand, when the user selects the moving picture, the operation section 2 acquires image data D9 of the moving picture on a condition Ax (step S606). The condition Ax is a condition of the voltage V3 or the frequency F3 to be applied to the optical low pass filter 10, and is an updatable condition. The initial condition Ax may be, for example, Vf or Ff. Specifically, the control circuit 22 instructs the image pickup device 1 to apply the voltage Vf or a voltage of the frequency Ff to the optical low pass filter 10, and the preprocessing circuit 21 acquires the image data Drow of the moving picture that is obtained by performing exposure on the condition Ax, from the image pickup element 60. The control circuit 22 acquires the image data D9 of the moving picture that is obtained by processing the image data Drow in the preprocessing circuit 21, from the preprocessing circuit 21. Next, the operation section 2 stores the image data D9 of the moving picture in the memory section 4 (step S607).

Next, the operation section 2 acquires image data D10 of the still image on a condition Ay at a predetermined timing (or a periodic timing) (step S608). In other words, the operation section 2 temporarily changes the voltage V3 or the frequency F3 to acquire the image data D10 of the still image while acquiring the image data D9 (a plurality of pieces of image data) of the moving picture in the moving picture mode. The condition Ay is a condition of the voltage V3 or the frequency F3 to be applied to the optical low pass filter 10, and is an updatable condition. Moreover, the condition Ay may be a condition suitable for the moving picture. For example, the initial condition Ay may be Vg or Fg. Specifically, the control circuit 22 instructs the image pickup device 1 to change the condition from the condition Ax to the condition Ay at the predetermined timing (or the periodic timing), and the preprocessing circuit 21 acquires the image data Drow of the still image that is obtained by performing exposure on the condition Ay, from the image pickup element 60. The control circuit 22 acquires the image data D10 of the still image that is generated by processing the image data Drow in the preprocessing circuit 21, from the preprocessing circuit 21. Next, the operation section 2 stores the image data D10 of the still image in the memory section 4 (step S609). Note that the voltage V1 or the frequency F1, or the voltage V2 or the frequency F2 may be set in any of the above-described conditions Ax and Ay.

Next, the operation section 2 requests the user to make an answer whether the capturing is ended or continued (step S610). As a result, when the user selects end, the operation section 2 ends the capturing. On the other hand, when the user selects continuation, the operation section 2 determines whether the condition Ax is a suitable condition (step S611). Specifically, the operation section 2 determines whether the condition Ax is the suitable condition based on a difference between the image data D9 of the moving picture and the image data D10 of the still image that is acquired on the condition of the temporarily changed voltage V3 or the temporarily changed frequency F3.

As a result, when it is determined that the condition Ax is the suitable condition, the operation section 2 continuously performs the capturing of the moving picture on the condition Ax. On the other hand, when it is determined that the condition Ax is not the suitable condition, the operation section 2 derives new voltage V3 or new frequency F that is used in the moving picture mode, to change the condition Ax (step S612). After that, the operation section 2 continues to perform capturing of the moving picture on the changed condition Ax.

In this way, in the image pickup apparatus 100, only changing the condition of the voltage V3 or the frequency F3 to be applied to the optical low pass filter 10 makes it possible to temporarily change the cutoff frequency fc that is one of parameters specifying the blurring quantity of the image, to capture the still image while capturing the moving picture. Further, propriety of the condition of the moving picture is allowed to be determined in real time with use of the image data D9 of the moving picture and the image data D10 of the still image temporarily captured.

Hereinbefore, although the present technology has been described with referring to the embodiments, and the modifications thereof the present technology is not limited thereto, and various modifications may be made. Note that the effects described in the present specification are merely exemplified. The effects of the present technology are not limited to those described in the present specification. The present technology may have effects other than those described in the present specification.

Moreover, for example, the present technology may be configured as follows.

(1)

An image pickup device including:

an optical low pass filter; and.

a drive circuit configured to drive the optical low pass filter, wherein the optical low pass filter includes a pair of birefringent plates in which separation directions of image are opposite to each other or are the same as each other, each of the birefringent: plates having birefringence, a liquid crystal layer provided between the pair of birefringent plates and configured to control polarization, and an electrode configured to apply an electric field to the liquid crystal layer, and the drive circuit applies an intermediate voltage or an intermediate frequency to the electrode, the intermediate voltage being a voltage between a voltage at a rising position and a voltage at a falling position of a polarization conversion efficiency curve of the liquid crystal layer, and the intermediate frequency being a frequency between a frequency at the rising position and a frequency at the falling position.

(2)

The image pickup device according to (1), wherein the pair of birefringent plates and the liquid crystal layer generate three or four peaks in a point image intensity distribution of transmitted light of the optical low pass filter when the intermediate voltage or the intermediate frequency is applied to the electrode.

(3)
The image pickup device according to (2), wherein the pair of birefringent plates and the liquid crystal layer maintain a distance of two peaks on both ends out of the three or four peaks, irrespective of a magnitude of the intermediate voltage or the intermediate frequency.

(4)
The image pickup device according to (3), wherein the liquid crystal layer is a twisted nematic (TN) liquid crystal or a vertical alignment (VA) liquid crystal.

(5)
The image pickup device according to any one of (1) to (14), wherein
a separation width of an image in one of the birefringent plates is equal to a separation width of an image in the other of the birefringent plates, and
the pair of birefringent plates and the liquid crystal layer generate three peaks in a point image intensity distribution of transmitted light of the optical low pass filter when the intermediate voltage or the intermediate frequency is applied to the electrode.

(6)
The image pickup device according to any one of (1) to (51 wherein each of the birefringent plates is formed of liquid crystal, calcite, or lithium niobate.

(7)
The image pickup device according to any one of (1) to (6), wherein the electrode includes two sheet electrodes that are provided to face each other with the liquid crystal layer in between.

(8)
An image pickup apparatus provided with an image pickup device configured to output image data and an operation section configured to control the image pickup device and to perform predetermined processing on the image data output from the image pickup device, the image pickup device including:
an optical low pass filter;
an image pickup element configured to output the image data corresponding to transmitted light of the optical low pass filter; and
a drive circuit configured to drive the optical low pass filter and the image pickup element, wherein
the optical low pass filter includes
a pair of birefringent plates in which separation directions of image are opposite to each other or are the same as each other, each of the birefringent plates having birefringence,
a liquid crystal layer disposed between the pair of birefringent plates and configured to control polarization, and
an electrode configured to apply an electric field to the liquid crystal layer, and
the drive circuit applies an intermediate voltage or an intermediate frequency to the electrode, the intermediate voltage being a voltage between a voltage at a rising position and a voltage at a falling position of a polarization conversion efficiency curve of the liquid crystal layer, and the intermediate frequency being a frequency between a frequency at the rising position and a frequency at the failing position.

(9)
The image pickup apparatus according to (8), wherein the operation section sequentially applies a plurality of the intermediate voltages or a plurality of the intermediate frequencies to the electrode to acquire, from the image pickup element, a plurality of pieces of the image data that have blurring quantities of image different from one another, the plurality of intermediate voltages having magnitudes different from one another, and the plurality of intermediate frequencies having magnitudes different from one another.

(16)
The image pickup apparatus according to (9), wherein the operation section uses difference of two pieces of the image data, blurring quantities of image of which are different from each other, to generate processed data having reduced false signal.

(11)
The image pickup apparatus according to (9), wherein the operation section adds two pieces of the image data, blurring quantities of image of which are different from each other, to generate processed data having reduced false signal.

(12)
The image pickup apparatus according to (9), wherein the operation section combines two pieces of the image data, blurring quantities of image of which are different from each other, to generate processed data in which a blurring quantity of image is partially different.

(13)
The image pickup apparatus according to any one of (8) to (12), wherein the operation section changes a magnitude of the intermediate voltage or the intermediate frequency depending on a still image mode or a moving picture mode.

(14)
The image pickup apparatus according to (13), wherein the operation section temporarily varies the intermediate voltage or the intermediate frequency to acquire the image data while acquiring a plurality of pieces of the Image date in the moving picture mode.

(15)
The image pickup apparatus according to (14), wherein the operation section drives and updates new intermediate voltage or new intermediate frequency, based on difference between the plurality of pieces of image data acquired in the moving picture mode and the image data acquired at the temporarily changed intermediate voltage or at the temporarily changed intermediate frequency, the new intermediate voltage and the new intermediate frequency are used in the moving picture mode.

(16)
An optical low pass filter including:
a pair of birefringent plates in which separation directions of image are opposite to each other or are the same as each other, each of the birefringent plates having birefringence;
a liquid crystal layer disposed between the pair of birefringent plates and configured to control polarization; and
an electrode configured to apply an electric field to the liquid crystal layer, wherein the pair of birefringent plates and the liquid crystal layer generate three or four peaks in a point image intensity distribution of transmitted light of the birefringent plate on a subsequent stage when an intermediate voltage or an intermediate frequency is applied to the electrode, the intermediate voltage being a voltage between a voltage at a rising position and a voltage at a falling position of a polarization conversion efficiency curve of the liquid crystal layer, and the intermediate frequency being a frequency between a frequency at the rising position and a frequency at the falling position.

(17)
An image pickup device including;
an optical filter including
a first birefringent member;
a second birefringent member;
a liquid crystal layer disposed between the first and second birefringent members and configured to control polarization; and an electrode configured to apply an electric field to the liquid crystal layer; and
a drive circuit configured to apply an intermediate voltage or an intermediate frequency to the electrode,

(18)
The image pickup device of (17), wherein
the intermediate voltage is a voltage between a voltage at a rising position and a voltage at a falling position of a polarization conversion efficiency curve of the liquid crystal layer, and
the intermediate frequency is a frequency between a frequency at the rising position and a frequency at the tailing position of the polarization conversion efficiency curve of the liquid crystal layer,

(19)
The image pickup device of (17), wherein
the first and second birefringent members and the liquid crystal layer are configured to generate a plurality of peaks in a point image Intensity distribution of light transmitted through the optical filter when the intermediate voltage or the intermediate frequency is applied to the electrode.

(20)
The image pickup device of (19), wherein
the first and second birefringent members and the liquid crystal layer are configured to maintain a predetermined distance between a first and a last of the plurality of peaks irrespective of a magnitude of the intermediate voltage or the intermediate frequency.

(21)
The image pickup device of any of (17) to (20), wherein
the liquid crystal layer is a twisted nematic (TN) liquid crystal or a vertical alignment (VA) liquid crystal.

(22)
The image pickup device of (1), wherein
a separation width of an image in the first birefringent member is substantially equal to a separation width of an image in the second birefringent member, and
the first and second birefringent members and the liquid crystal layer are configured to generate three peaks in a point image intensity distribution of light transmitted through the optical filter based on the intermediate voltage or the intermediate frequency applied to the electrode.

(23)
The image pickup device of any of (17) to (22), wherein
the first and second birefringent members are formed of liquid crystal, calcite, or lithium niobate.

(24)
The image pickup device of any of (17) to (23), wherein
the electrode includes a first electrode and a second electrode, and
the liquid crystal layer in disposed between the first electrode and the second electrode.

(25)
An image pickup apparatus including:
an optical filter including
a first birefringent member;
a second birefringent member;
a liquid crystal layer disposed between the first and second birefringent members and configured to control polarization; and
an electrode configured to apply an electric field to the liquid crystal layer;
an image pickup element configured to output image data corresponding to light transmitted through the optical filter; and
circuitry configured to drive the optical filter and the image pickup element, wherein the circuitry is applies an intermediate voltage or an intermediate frequency to the electrode.

(26)
The image pickup apparatus of (25), wherein
the intermediate voltage is a voltage between a voltage at a rising position and a voltage at a falling position of a polarization conversion efficiency curve of the liquid crystal layer, and
the intermediate frequency is a frequency between a frequency at the rising position and a frequency at the falling position of the polarization conversion efficiency curve of the liquid crystal layer.

(27)
The image pickup apparatus of (26), wherein
the circuitry is configured to sequentially apply a plurality of the intermediate voltages or a plurality of the intermediate frequencies to the electrode to acquire, from the image pickup element, a plurality of pieces of the image data each having differing quantities of blur, and
the plurality of intermediate voltages each have different magnitudes, and the plurality of intermediate frequencies each have different magnitudes.

(28)
The image pickup apparatus of (25), wherein the circuitry is configured to process two of the plurality of pieces of the image data to generate processed data having a reduced false signal

(29)
The image pickup apparatus of (25), wherein the circuitry is configured to add two of the plurality of pieces of the image data to generate processed data having a reduced false signal.

(30)
The image pickup apparatus of (25), wherein the circuitry is configured to combine two pieces of the plurality of pieces of the image data to generate processed data in which a blur quantity of image is partially different.

(31)
The image pickup apparatus of (26), wherein the circuitry is configured to change a magnitude of the intermediate voltage or the intermediate frequency based on whether the image pickup apparatus is in a still image mode or a moving picture mode.

(32)
The image pickup apparatus of (31), wherein the circuitry is configured to temporarily vary the intermediate voltage or the intermediate frequency to acquire the image data while acquiring a plurality of pieces of the image data in the moving picture mode.

(33)
The image pickup apparatus of (32), wherein the circuitry is configured to set a new intermediate voltage or a new intermediate frequency for the moving picture mode based on a difference between the plurality of pieces of image data acquired at the temporarily changed intermediate voltage or at the temporarily changed intermediate frequency.

(34)
An optical filter including:
a first birefringent member;
a second birefringent member;
a liquid crystal layer disposed between the first and second birefringent members and configured to control polarization; and
an electrode configured to apply an electric field to the liquid crystal layer, wherein the first and second birefringent members and the liquid crystal layer are configured to generate a plurality of peaks in a point image intensity distribution of light transmitted through the optical filter based on an intermediate voltage or an intermediate frequency applied to the electrode.

(35)
The optical filter of (34), wherein
the intermediate voltage is a voltage between a voltage at a rising position and a voltage at a falling position of a polarization conversion efficiency curve of the liquid crystal layer, and
the intermediate frequency is a frequency between a frequency at the rising position and a frequency at the falling position of the polarization conversion efficiency curve of the liquid crystal layer.

(36)
An control device including:
a drive circuit configured to apply an electric field to an optical filter,
the optical filter including
a first birefringent member;
a second birefringent member;
a liquid crystal layer disposed between the first and second birefringent members and configured to control polarization; and
an electrode configured to apply the electric field to the liquid crystal layer,
wherein, the drive circuit configured to apply an intermediate voltage or an intermediate frequency to the electrode.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Image pickup device
2 Operation section
3 Display section
4 Memory section
5 Input section
10 Optical low pass filter
10A Light incident surface
10B Light emission surface
11A Normal
11, 15, 80 Birefringent plate
12, 14 Electrode
13 Liquid crystal layer
16 AR layer
17 Low reflection layer
20, 50 Drive circuit
21 Preprocessing circuit
22 Control circuit
23 Display processing circuit
24 Compression expansion circuit
25 Memory control circuit
30 Lens
40 Iris
60 Image pickup element
70 Phase canceling plate
100 Image pickup apparatus
A1, A2, A3, A4, A5, Ax, Ay, B1, B2, B3, C1, C2, C3 Condition
D1, D2, D3, D7, D8, D9, D10 Drow Image data
D4, D5, D6 Processed data
L1 Incident light
L2 Transmitted light
θ1, η2, θ3 Angle
ΔD1 Difference data

The invention claimed is:

1. An image pickup device, comprising:
an optical filter that includes:
a first birefringent member;
a second birefringent member;
a liquid crystal layer between the first birefringent member and the second birefringent member, wherein the liquid crystal layer is configured to control polarization; and
an electrode configured to apply an electric field to the liquid crystal layer; and
a drive circuit configured to apply one of an intermediate voltage or an intermediate frequency to the electrode,
wherein a polarization conversion efficiency of the liquid crystal layer is set based on the one of the intermediate voltage or the intermediate frequency applied to the electrode,
wherein a separation width of a first image in the first birefringent member is substantially equal to a separation width of a second image in the second birefringent member,
wherein, based on the one of the intermediate voltage or the intermediate frequency applied to the electrode, the first birefringent member, the second birefringent member, and the liquid crystal layer are configured to generate at least three peaks in a point image intensity distribution of light transmitted through the optical filter, and
wherein an intensity of each of the at least three peaks is varied based on a magnitude of the one of the intermediate voltage or the intermediate frequency applied to the electrode.

2. The image pickup device of claim 1,
wherein the intermediate voltage is between a first voltage at a rising position and a second voltage at a falling position of a polarization conversion efficiency curve of the liquid crystal layer, and
wherein the intermediate frequency is between a first frequency at the rising position and a second frequency at the falling position of the polarization conversion efficiency curve of the liquid crystal layer.

3. The image pickup device of claim 1, wherein the first birefringent member, the second birefringent member, and the liquid crystal layer are configured to generate a plurality of peaks in the point image intensity distribution of the light transmitted through the optical filter, based on the application of the one of the intermediate voltage or the intermediate frequency to the electrode, and wherein the plurality of peaks includes the at least three peaks.

4. The image pickup device of claim 3, wherein the first birefringent member, the second birefringent member, and the liquid crystal layer are further configured to maintain a specific distance between a first peak of the plurality of peaks and a last peak of the plurality of peaks irrespective of a magnitude of the one of the intermediate voltage or the intermediate frequency.

5. The image pickup device of claim 1, wherein the liquid crystal layer is one of a twisted nematic (TN) liquid crystal or a vertical alignment (VA) liquid crystal.

6. The image pickup device of claim 1, wherein each of the first birefringent member and the second birefringent member includes one of liquid crystal, calcite, or lithium niobate.

7. The image pickup device of claim 1, wherein the electrode includes a first electrode and a second electrode, and wherein the liquid crystal layer is between the first electrode and the second electrode.

8. The image pickup device of claim 1, wherein an optical axis of the first birefringent member intersects with an optical axis of the second birefringent member at an angle that is greater than 0°.

9. An image pickup apparatus, comprising:
an optical filter that includes:
a first birefringent member;
a second birefringent member;
a liquid crystal layer between the first birefringent member and the second birefringent member, wherein the liquid crystal layer is configured to control polarization; and
an electrode configured to apply an electric field to the liquid crystal layer;
an image pickup element configured to output image data that corresponds to light transmitted through the optical filter; and
circuitry configured to:
drive the optical filter and the image pickup element; and
apply one of an intermediate voltage or an intermediate frequency to the electrode,
wherein a polarization conversion efficiency of the liquid crystal layer is set at least based on the one of the intermediate voltage or the intermediate frequency applied to the electrode,
wherein a separation width of a first image in the first birefringent member is substantially equal to a separation width of a second image in the second birefringent member,
wherein, based on the one of the intermediate voltage or the intermediate frequency applied to the electrode, the first birefringent member, the second birefringent member, and the liquid crystal layer are configured to generate at least three peaks in a point image intensity distribution of the light transmitted through the optical filter, and
wherein an intensity of each of the at least three peaks is varied based on a magnitude of the one of the intermediate voltage or the intermediate frequency applied to the electrode.

10. The image pickup apparatus of claim 9,
the intermediate voltage is between a first voltage at a rising position and a second voltage at a falling position of a polarization conversion efficiency curve of the liquid crystal layer, and
the intermediate frequency is between a first frequency at the rising position and a second frequency at the falling position of the polarization conversion efficiency curve of the liquid crystal layer.

11. The image pickup apparatus of claim 10, wherein
the circuitry is further configured to sequentially apply one of a plurality of intermediate voltages or a plurality of intermediate frequencies to the electrode to acquire, from the image pickup element, a plurality of pieces of the image data, wherein each of the plurality of pieces of the image data has different quantities of blur, and
wherein each of the plurality of intermediate voltages has different magnitudes, and each of the plurality of intermediate frequencies has different magnitudes.

12. The image pickup apparatus of claim 10, wherein the circuitry is further configured to change the magnitude of the one of the intermediate voltage or the intermediate frequency based on whether the image pickup apparatus is in one of a still image mode or a moving picture mode.

13. The image pickup apparatus of claim 12, wherein the circuitry is further configured to temporarily change the one of the intermediate voltage or the intermediate frequency to acquire the image data, based on acquisition of a plurality of pieces of the image data in the moving picture mode.

14. The image pickup apparatus of claim 13, wherein the circuitry is further configured to set one of a new intermediate voltage or a new intermediate frequency for the moving picture mode based on a difference between the plurality of pieces of the image data acquired at the one of the temporarily changed intermediate voltage or the temporarily changed intermediate frequency.

15. The image pickup apparatus of claim 9, wherein the circuitry is further configured to process two pieces of a plurality of pieces of the image data to generate processed data having a reduced false signal.

16. The image pickup apparatus of claim 9, wherein the circuitry is further configured to add two pieces of a plurality of pieces of the image data to generate processed data having a reduced false signal.

17. The image pickup apparatus of claim 9, wherein the circuitry is further configured to combine two pieces of a plurality of pieces of the image data to generate processed data in which a blur quantity of image is partially different.

18. An optical filter, comprising:
a first birefringent member;
a second birefringent member;
a liquid crystal layer between the first birefringent member and the second birefringent member, wherein the liquid crystal layer is configured to control polarization; and
an electrode configured to apply an electric field to the liquid crystal layer,
wherein a separation width of a first image in the first birefringent member is substantially equal to a separation width of a second image in the second birefringent member,
wherein the first birefringent member, the second birefringent member, and the liquid crystal layer are configured to generate at least three peaks of in a point image intensity distribution of light transmitted through the optical filter, based on one of an intermediate voltage or an intermediate frequency applied to the electrode,
wherein an intensity of each of the at least three peaks is varied based on a magnitude of the one of the intermediate voltage or the intermediate frequency applied to the electrode, and
wherein a polarization conversion efficiency of the liquid crystal layer is set at least based on the one of the intermediate voltage or intermediate frequency applied to the electrode.

19. The optical filter of claim 18, wherein
wherein the intermediate voltage is between a first voltage at a rising position and a second voltage at a falling position of a polarization conversion efficiency curve of the liquid crystal layer, and
wherein the intermediate frequency is between a first frequency at the rising position and a second frequency at the falling position of the polarization conversion efficiency curve of the liquid crystal layer.

20. A control device, comprising:
an optical filter that includes:
a first birefringent member;
a second birefringent member;
a liquid crystal layer between the first birefringent member and the second birefringent member, wherein the liquid crystal layer is configured to control polarization;

an electrode configured to apply an electric field to the liquid crystal layer; and a drive circuit configured to apply one of an intermediate voltage or an intermediate frequency to the electrode, wherein a polarization conversion efficiency of the liquid crystal layer is set at least based on one of the intermediate voltage or the intermediate frequency applied to the electrode, wherein a separation width of a first image in the first birefringent member is substantially equal to a separation width of a second image in the second birefringent member, wherein, based on the one of the intermediate voltage or the intermediate frequency applied to the electrode, the first birefringent member, the second birefringent member, and the liquid crystal layer are configured to generate at least three peaks in a point image intensity distribution of light transmitted through the optical filter, and wherein an intensity of each of the at least three peaks is varied based on a magnitude of the one of the intermediate voltage or the intermediate frequency applied to the electrode.

\* \* \* \* \*